US010567958B2

United States Patent
Nagashige et al.

(10) Patent No.: US 10,567,958 B2
(45) Date of Patent: Feb. 18, 2020

(54) SYSTEM AND METHOD FOR MANAGING AND AUTHENTICATING COMMUNICATIONS CONNECTIONS

(71) Applicant: Ricoh Company, Ltd., Tokyo (JP)

(72) Inventors: Yuko Nagashige, Osaka (JP); Yoshikazu Azuma, Tokyo (JP); Takayuki Kunieda, Tokyo (JP); Tatsuo Miyachi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 180 days.

(21) Appl. No.: 15/096,474

(22) Filed: Apr. 12, 2016

(65) Prior Publication Data

US 2016/0309525 A1 Oct. 20, 2016

(30) Foreign Application Priority Data

Apr. 20, 2015 (JP) ................................ 2015-085713

(51) Int. Cl.
*H04W 12/06* (2009.01)
*H04W 12/08* (2009.01)
(Continued)

(52) U.S. Cl.
CPC .......... *H04W 12/06* (2013.01); *H04L 63/108* (2013.01); *H04W 12/08* (2013.01); *H04W 12/00502* (2019.01)

(58) Field of Classification Search
CPC ...... H04W 12/06; H04W 12/08; H04L 63/108
See application file for complete search history.

(56) References Cited

U.S. PATENT DOCUMENTS 8,334,994 B2 12/2012 Sakagami et al.
2005/0018686 A1* 1/2005 Igarashi ................ H04W 48/14
370/395.2
(Continued)

FOREIGN PATENT DOCUMENTS

JP 2001103048 A 4/2001
JP 2001255956 A 9/2001
(Continued)

OTHER PUBLICATIONS

Japanese Office Action dated May 28, 2019, in corresponding Japanese Application No. 2015-085713, 2 pages.

*Primary Examiner* — Peter P Chau
(74) *Attorney, Agent, or Firm* — Xsensus LLP

(57) ABSTRACT

A communications system includes a first communications part configured to perform communications with a terminal apparatus, a second communications part configured to perform communications via a network, a connection controller configured to start establishing a connection or release a connection between the first communications part and the second communications part, a display part configured to display authentication information transmitted from the terminal apparatus, an input part configured to receive an input from a user, and a connection manager configured to manage a time to allow the user to have a connection to the network in accordance with an instruction input by the user when the authentication information displayed by the display part matches authentication information reported in advance to the user who has been allowed to have the connection to the network.

20 Claims, 19 Drawing Sheets

(51) Int. Cl.
*H04L 29/06* (2006.01)
*H04W 12/00* (2009.01)

(56) References Cited

U.S. PATENT DOCUMENTS

| | | | |
|---|---|---|---|
| 2008/0126548 A1* | 5/2008 | Moore | G06F 11/2005 |
| | | | 709/227 |
| 2010/0115587 A1* | 5/2010 | Kubota | G06F 21/34 |
| | | | 726/3 |
| 2010/0253788 A1 | 10/2010 | Okano | |
| 2012/0291106 A1* | 11/2012 | Sasaki | G06F 21/556 |
| | | | 726/5 |
| 2015/0078362 A1 | 3/2015 | Kunieda et al. | |
| 2015/0181499 A1 | 6/2015 | Azuma | |
| 2017/0280327 A1* | 9/2017 | Masuoka | H04W 12/08 |

FOREIGN PATENT DOCUMENTS

| | | |
|---|---|---|
| JP | 2007-235713 | 9/2007 |
| JP | 2008-211446 | 9/2008 |
| JP | 2010-245839 | 10/2010 |
| JP | 2015-122556 | 7/2015 |
| JP | 2016-012909 | 1/2016 |
| WO | 2015/186450 | 12/2015 |

* cited by examiner

FIG.4

| No. | IP ADDRESS | 105 |
|---|---|---|
| 1 | IP ADDRESS OF MFP 51 |
| 2 | IP ADDRESS OF PJ 52 |
| 3 | IP ADDRESS OF TBL 54 |
| 4 | IP ADDRESS OF IWB 50 |
| : | : |

FIG.11

| No. | IDENTIFICATION INFORMATION | AUTHENTICATION INFORMATION |
|---|---|---|
| 1 | MAC ADDRESS_01 OF TERMINAL APPARATUS 20a | AUTHENTICATION INFORMATION (IMAGE) INPUT FROM TERMINAL APPARATUS 20a |
| 2 | MAC ADDRESS_02 OF TERMINAL APPARATUS 20b | AUTHENTICATION INFORMATION (IMAGE) INPUT FROM TERMINAL APPARATUS 20b |
| 3 | MAC ADDRESS_03 OF TERMINAL APPARATUS 20c | AUTHENTICATION INFORMATION (IMAGE) INPUT FROM TERMINAL APPARATUS 20c |

107

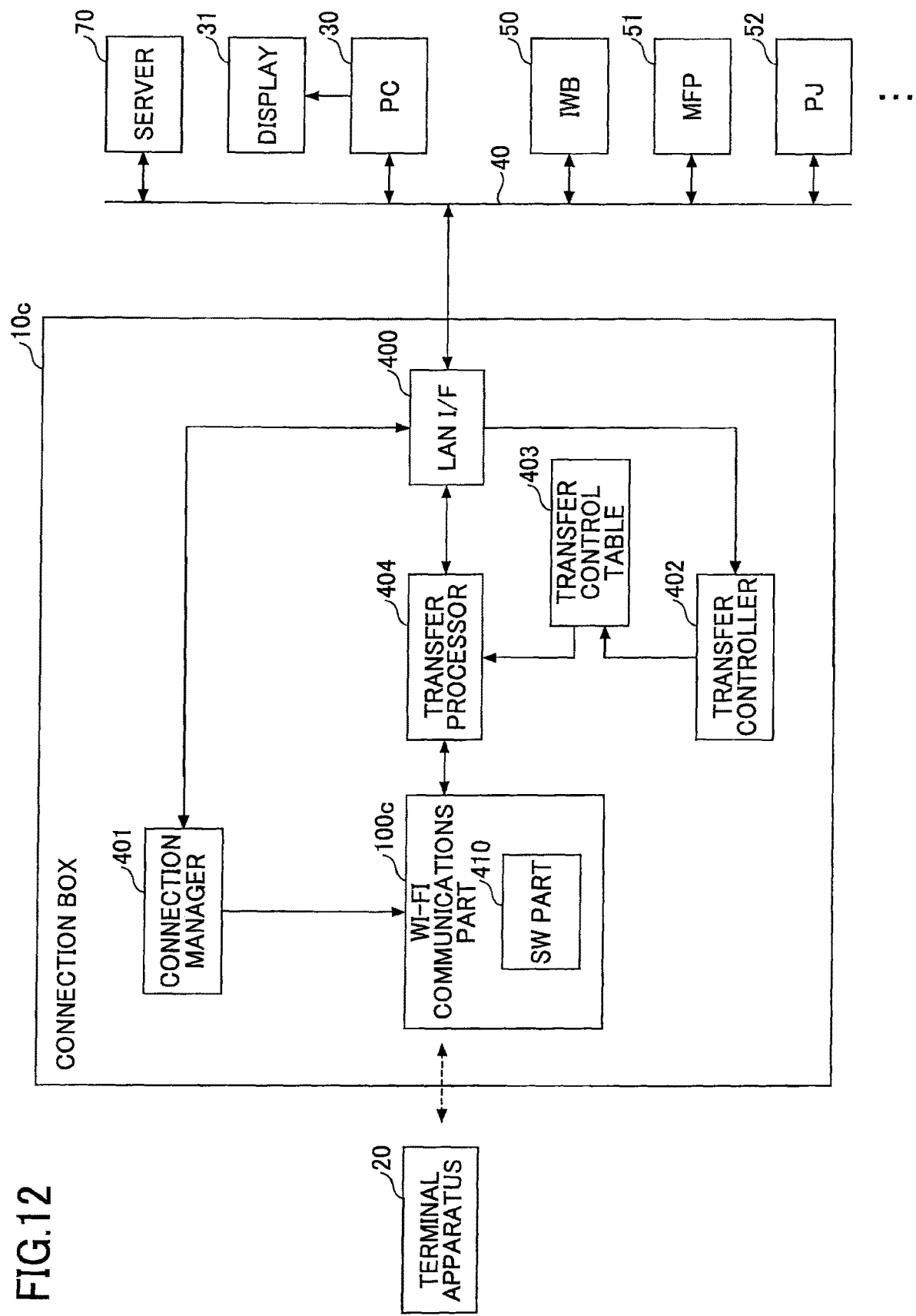

FIG.13

| No. | IP ADDRESS OF TRANSMISSION SOURCE | IP ADDRESS OF TRANSMISSION DESTINATION | ACTION |
|---|---|---|---|
| 1 | IP ADDRESS OF TERMINAL APPARATUS 20 | IP ADDRESS OF MFP 51 | TRANSFER PACKET TO MFP 51 (FORWARD) |
| 2 | IP ADDRESS OF TERMINAL APPARATUS 20 | IP ADDRESS OF PJ 52 | TRANSFER PACKET TO PJ 52 (FORWARD) |
| : | : | : | : |

SYSTEM AND METHOD FOR MANAGING AND AUTHENTICATING COMMUNICATIONS CONNECTIONS

BACKGROUND OF THE INVENTION

1. Field of the Invention

The disclosures discussed herein relate to a technology to facilitate connections of external apparatuses to a secure local area network (LAN).

2. Description of the Related Art

Organizations such as corporations generally construct local area networks (hereinafter called "internal organization LANs) to allow information processing apparatuses to mutually connect to one another within the organizations via the LANs. The organizations further construct internal organization LANs to allow members belonging to the organizations to have their information processing apparatuses connected to the internal organization LANs via wireless LANs, which enables the members to have their information processing apparatuses access various apparatuses such as multifunction printers and projector apparatuses connected to the internal organization LANs.

The internal organization LAN and the wireless LAN connected to the internal organization LAN generally perform authentication processes on external apparatuses to only allow the successfully authenticated external apparatuses to access various apparatuses connected to the internal organization LAN and the wireless LAN. Patent Document 1 discloses a technology to perform authentication using unique user information or an active directory to allow users to access MFPs connected to a network.

The following assumes a case where users who are outsiders of an organization attempt to access an apparatus (e.g., a projector apparatus) connected to the internal organization LAN. Most information processing apparatuses of such outside users are not allowed to connect to the organization LAN in view of security. The outside users are thus not allowed to access various apparatuses residing in the organization via the organization LAN or are required to access various apparatuses in the organization via a legacy connection, which may inconvenience the outside users.

Such a related art technology may require the legacy connection such as a video graphics array (VGA) or a digital visual interface (DVI) for an outside user of the organization to use a projector apparatus residing within the organization. This may take a great deal of time such as preparing a connection cable for the legacy connection, and inconvenience the outside user.

There is also proposed in the related art a method of establishing a specific guest network for temporarily allowing outside users of an organization to a LAN. Implementing this method may require reconstruction and resetting the network architectural and operational levels such as dividing a logical network using a virtual LAN (VLAN). Further, the frequency of using the guest network is generally low, which indicates continuously establishing a hardly used guest-specific network. This may lead to inefficiency in cost or electric power consumption.

In addition, a guest-specific wireless LAN requires a laborious task of teaching the outside user settings of the guest-specific wireless LAN, which virtually has no security setting involving a handwritten or orally communicated password or the like. This may expose the wireless LAN communications via a guest terminal to a security threat such as eavesdropping.

Moreover, when temporarily allowed connection to the LAN from the outside user is left as it is without releasing the temporarily allowed connection, the outside user is continuously allowed to connect to the organization LAN via that terminal. This may have a risk of allowing a third party to accidentally connect to the organization LAN.

RELATED ART DOCUMENT

Patent Document

Patent Document 1: Japanese Unexamined Patent Application Publication No. 2007-235713

SUMMARY OF THE INVENTION

Accordingly, it is an object in one embodiment of the present invention to provide a technology capable of allowing an information processing apparatus of an outside user who is outside an organization to easily connect to an internal organization network while assuring security that substantially obviates one or more problems caused by the limitations and disadvantages of the related art.

According to an aspect of embodiments, there is provided a communications system that includes a first communications part configured to perform communications with a terminal apparatus; a second communications part configured to perform communications via a network; a connection controller configured to start establishing a connection or release a connection between the first communications part and the second communications part; a display part configured to display authentication information transmitted from the terminal apparatus; an input part configured to receive an input from a user; and a connection manager configured to manage a time to allow the user to have a connection to the network in accordance with an instruction input by the user when the authentication information displayed by the display part matches authentication information reported in advance to the user who has been allowed to have the connection to the network.

Other objects, features and advantages of the present invention will become more apparent from the following detailed description when read in conjunction with the accompanying drawings.

BRIEF DESCRIPTION OF THE DRAWINGS

FIG. 4 is a table illustrating an example of a data structure of a connecting destination storage;

FIG. 11 is a table illustrating an example of a data structure of a connection management information storage;

FIG. 12 is a block diagram illustrating a configuration example of a connection box according to a second embodiment;

FIG. 13 is a table illustrating an example of a data structure of a transfer control table;

DETAILED DESCRIPTION OF THE PREFERRED EMBODIMENTS

The following describes preferred embodiments of a communications system and a communications method with reference to accompanying drawings.

Configuration Common to Embodiments

Figure 1:
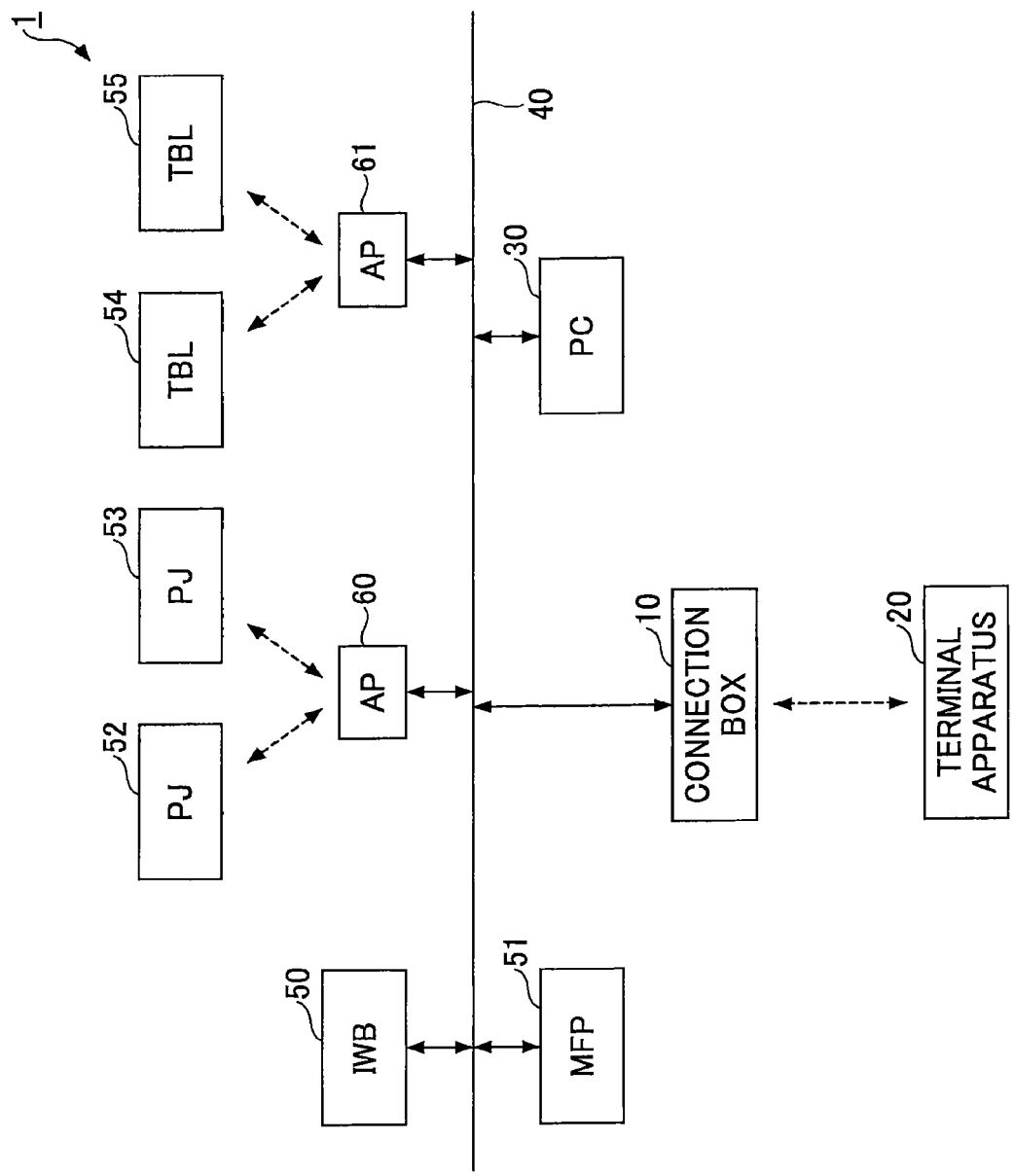
FIG. 1 is a diagram illustrating a configuration example of a network system applied to embodiments.

FIG. 1 is a diagram illustrating a configuration example of a network system 1 applied to the embodiments. A local area network (LAN) 40 may be a network system 1 configured to perform communications using, for example, (transmission control protocol/Internet protocol) TCP/IP as a protocol, and corresponds to an internal organization LAN having a structurally closed configuration within an organization such as corporation. Multiple apparatuses such as an interactive whiteboard (IWB) 50, a multi-function printer (MFP) 51, and a personal computer (PC) 30 are connected to the LAN 40 to allow the apparatuses to communicate with one another.

Access points (APs) 60 and 61 implemented by wireless local area network (wireless LAN), which is in compliance with Institute of Electrical and Electronics Engineers (IEEE) 802.11 standards, are also connected to the LAN 40. The wireless LAN in compliance with the IEEE 802.11 standards is hereinafter called "Wi-Fi" (registered trademark), which is a certified interoperability name given by Wi-Fi Alliance serving as an affiliate associated with the IEEE 802.11 apparatuses. In the example of FIG. 1, the AP 60 is configured to perform communications with Wi-Fi compatible projector apparatuses (PJs) 52 and 53. The AP 61 is configured to perform communications with Wi-Fi compatible tablet terminals (TBLs) 54 and 55.

The network system 1 having the above-described configuration enables to the IWB 50 to display information such as an image transmitted from the PC 30 via the LAN 40 or enables the MFP 51 to output the information via the LAN 40. The network system 1 also enables the PJ 52 and the PJ 53 to project information such as an image transmitted from the PC 30 onto a not-illustrated screen via the LAN 40 and the AP 60. The network system 1 may also transfer information transmitted from the TBL 54 or the TBL 55 to the LAN 40 via the AP 61 so as to supply the transferred information into the PC 30. The network system 1 may further transfer information such as images transmitted from the TBL 54 or the TBL 55 to the LAN 40 via the AP 61 so as to supply the transferred information to the IWB 50 or the MFP 51.

The PC 30, the IWB 50, and the MFP 51 directly connected to the LAN 40 and the TBL 54 and the TEL 55 indirectly connected to the LAN 40 are authenticated by the network system 1 including the LAN 40 within the organization. Specifically, in order for information processing apparatuses such as PCs outside the organization (hereinafter referred to as external apparatuses) to perform communications via the LAN 40, the external client apparatuses need to be authenticated within the organization.

A connection box 10 may be connected to the LAN 40, for example, wirelessly or with wire. The connection box 10 is authenticated by the network system 1 including the LAN 40 within the organization. The connection box 10 may thus be able to perform communications with various apparatuses including the PC 30 via the LAN 40.

The connection box 10 further includes an access point function compatible to such as Wi-Fi. This access point function enables the connection box 10 to perform wireless communications with a terminal apparatus 20, which resides outside the organization and has not been authenticated by the network system 1 including the LAN 40.

Note that the connection box 10 may be able to control connectability (open/release connection or close/establish connection) between the terminal apparatus 20 connected via wireless communications and the LAN 40 by instructions from outside. The terminal apparatus 20 may thus be connected to the LAN 40 only when the connection box 10 receives an instruction to establish connection between an external apparatus (terminal apparatus 20 in this case) and the LAN 40, and the terminal apparatus 20 may subsequently be allowed to perform communications with various apparatuses connected to the LAN 40. For example, the connection box 10 may control connectability between the terminal apparatus 20 and the LAN 40 by following instructions from the PC 30. Note that the connection being closed indicates the connection between the terminal apparatus 20 and the LAN 40 being maintained whereas the connection being open indicates the connection between the terminal apparatus 20 and the LAN 40 being released (disconnected).

When the PC 30 closes the connection between the LAN 40 and the terminal apparatus 20 connected via wireless communications, the PC 30 controls the connection box 10 to set a time to allow the external apparatus (terminal apparatus 20 in this case) to have connection (hereinafter called "connection allowable time") based on an instruction from outside. For example, the PC 30 controls the connection box 10 to close the connection between the terminal apparatus 20 and the LAN 40 until the connection allowable time has elapsed, and open the connection between the terminal apparatus 20 and the LAN 40 after the connection allowable time has elapsed. Note that an apparatus to control the connection box 10 is not limited to the PC 30 but any apparatus other than the PC 30 may control the connection box 10.

Figure 2:
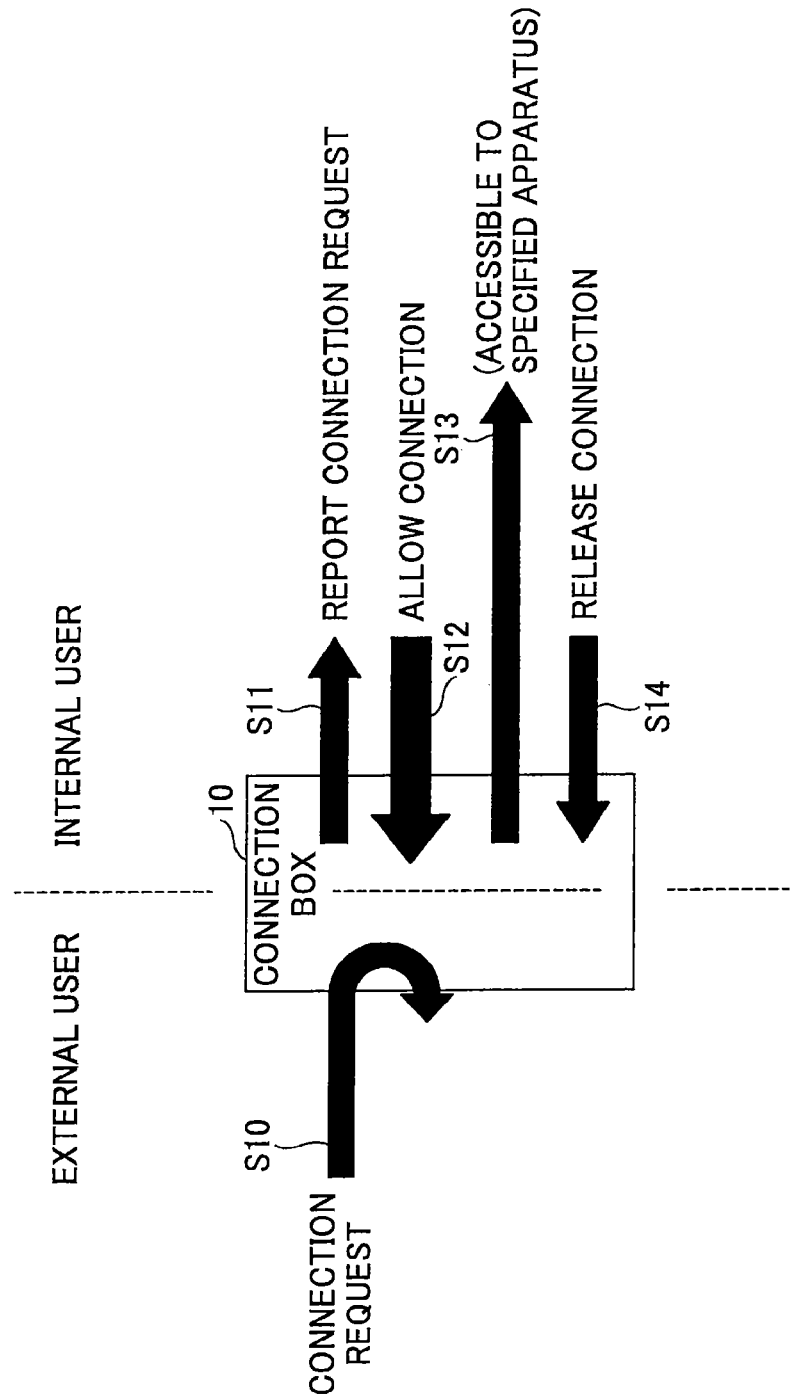
FIG. 2 is a schematic diagram illustrating a process of connecting a terminal apparatus and a LAN using a connection box according to the embodiments.

FIG. 2 is a schematic diagram illustrating a process of connecting the terminal apparatus 20 and the LAN 40 using the connection box 10 common to the embodiments. In FIG. 2, an external user represents a user of the terminal apparatus 20 residing outside the organization and an internal user represents a user of the LAN 40 residing within the organization. The internal user is assumed to access the connection box 10 from the PC 30, for example.

Before starting the process of FIG. 2, authentication information for the internal user to authenticate the external user is transmitted from the internal user to the external user by any method. According to the embodiments, the internal user himself/herself directly transmits the authentication information to the external user himself/herself. The method of reporting authentication information includes, but not particularly limited to, oral communications or written communications such as a memo. The authentication information may be reported by electronic mail (email). Note that the authentication information may be reported every time the terminal apparatus 20 connects to the LAN 40.

Initially, the network system 1 connects the terminal apparatus 20 and the connection box 10 via wireless communications with Wi-Fi. Note that an SSID (service set identifier) necessary for identifying the access point function of the connection box 10 may be transmitted in advance from the internal user to the external user. Note also that the access point function is not encrypted with a key such as wired equivalent privacy (WEP) key in the connection box 10.

In FIG. 2, the terminal apparatus 20 transmits a connection request to the connection box 10 (step S10). In this step, the terminal apparatus 20 receives the authentication information reported in advance by the internal user that is input by the external user. The terminal apparatus 20 adds the authentication information to the connection request to transmit the connection request with the authentication information to the connection box 10.

The connection box 10 reports the connection request and the authentication information from the terminal apparatus 20 to the internal user (step S11). For example, the connection box 10 transmits the connection request and the authentication information from the terminal apparatus 20 to the PC 30. The PC 30 receives the connection request and the authentication information and displays the received connection request and authentication information on a display of the PC 30.

Note that at this point, the connection box 10 opens the connection between the terminal apparatus 20 and the LAN 40 (disconnected). The connection box 10 may require the user of the terminal apparatus 20 (the external user) to hand over the connection request and the authentication information to a user of the LAN 40 (the internal user) via a memo or the like.

The internal user himself/herself actually observes the authentication information displayed on the display of the PC 30 to determine whether the displayed authentication information is correct. When the internal user himself/herself determines that the displayed authentication information is correct, the PC 30 receives a setting of the time to allow the terminal apparatus 20 to connect to the LAN 40 (i.e., the connection allowable time) from the internal user, and reports connection allowable information indicating "connection being allowed" to the connection box 10 (step S12). For example, the PC 30 receives an input of connection allowable information indicating connection allowed together with an input of the connection allowable time such as one hour from the internal user himself/herself. The PC 30 transmits the input connection allowable information to the connection box 10 and subsequently starts managing the connection allowable time within the PC 30.

The connection box 10 that has received the connection allowable information closes (i.e., establishes) the connection between the terminal apparatus 20 and the LAN 40. The terminal apparatus 20 is thus connected to the LAN 40 via the connection box 10. The connection box 10 has already been authenticated by the LAN 40. Hence, the terminal apparatus 20 may be able to access apparatuses connected to the LAN 40 via the connection box 10 (step S13).

In this step, the connection box 10 may be able to store in advance the connectable apparatuses specified by the internal user. Referring back to FIG. 1, when the external user is, for example, allowed to access the IWB 50 and the PJ 52, the connection box 10 may store in advance internet protocol (IP) addresses of the IWB 50 and the PJ 52 as connecting destination information.

When the internal user explicitly indicates cancelling the access to the LAN 40, or when the connection allowable time specified by the internal user has elapsed, the connection box 10 releases the connection of the external user (step S14). For example, when the connection box 10 receives a connection release request from the internal user himself/herself that has allowed the connection of the terminal apparatus 20, the connection box 10 releases the connection of the terminal apparatus 20.

Note that when the PC 30 detects that the connection allowable time has elapsed, the PC 30 transmits the connection release request for releasing the connection of the terminal apparatus 20 to the connection box 10. In such a case, the connection box 10 releases the connection from the terminal apparatus 20 to the LAN 40 by following the received request. A specific process of releasing the connection includes opening the connection between the terminal apparatus 20 and the LAN 40, deleting the used authentication information, initializing connection information between the external user and the connection box 10, and cutting the connection between the external user and the connection box 10.

According to the embodiments, the PC 30 manages the connection between the terminal apparatus 20 residing outside the organization and the LAN 40 residing inside the organization via the connection box 10. Further, a person inside the organization determines whether to allow the connection between the terminal apparatus 20 and the LAN 40, based on the already reported authentication information that is input by a person outside the organization. This may facilitate connecting the terminal apparatus 20 to the LAN 40. This enables the PC 30 to prevent the users outside the organization from intentionally intruding on the LAN 40.

Further, the PC 30 assigns limitation to the connection allowable time with respect to the connection between the terminal apparatus 20 and the LAN 40 inside the organization, based on instructions from the person inside the organization. Assigning the limitation to the connection allowable time with respect to the connection between the terminal apparatus 20 and the LAN 40 enables the PC 30 to automatically disconnect the terminal apparatus 20 from the LAN 40 after the connection allowable time has elapsed. This may prevent accidental continuous connection to the LAN 40 by the terminal apparatus 20 outside the organization that has previously allowed the connection to the LAN 40 after the connection allowable time has elapsed.

First Embodiment

Figure 3:
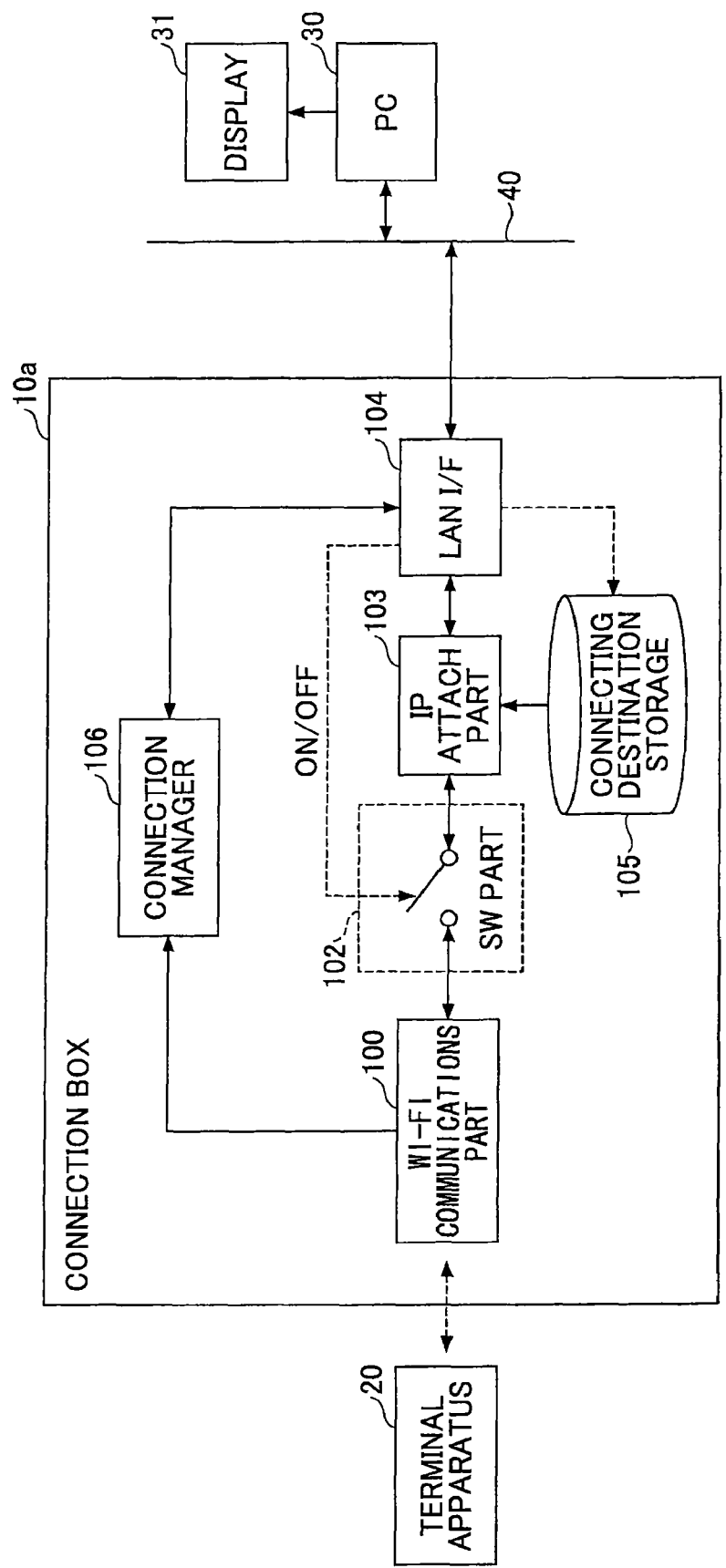
FIG. 3 is a block diagram illustrating a configuration example of a connection box according to a first embodiment.

The following gives a detailed description regarding the connection via the connection box 10. FIG. 3 illustrates an example of a connection box 10a according to a first embodiment. As illustrated in FIG. 3, the connection box 10a includes a Wi-Fi communications part 100, a switch (SW) part 102, an IP attach part 103, a LAN interface (I/F) 104, a connecting destination storage 105, and a connection manager 106.

The Wi-Fi communications part 100 includes an access point function using Wi-Fi to perform wireless communications using Wi-Fi. The Wi-Fi communications part 100 is configured to be identified by a predetermined service set identifier (SSID). When the terminal apparatus 20 detects the Wi-Fi communications part 100, the terminal apparatus 20 transmits the SSID set in the Wi-Fi communications part 100 to the Wi-Fi communications part 100 to establish the connection with the Wi-Fi communications part 100.

The terminal apparatus 20 that has established the connection with the Wi-Fi communications part 100 transmits authentication information input by the external user to the Wi-Fi communications part 100, as already described above. The Wi-Fi communications part 100 outputs the received authentication information to the connection manager 106. The connection manager 106 may include, for example, a memory to store the authentication information output from the Wi-Fi communications part 100. Alternatively, the connection manager 106 may directly transmit the authentication information output from the Wi-Fi communications part 100 to the PC 30 without storing the authentication information in the memory or the like.

The Wi-Fi communications part 100 that has established the connection with the terminal apparatus 20 outputs communications data transmitted form the terminal apparatus 20 to the IP attach part 103 via the SW part 102. Note that the Wi-Fi communications part 100 determines whether the data transmitted from the terminal apparatus 20 are authentication information or other communications data based on an identifier identifying content of the data embedded in the data transmitted from terminal apparatus 20.

The Wi-Fi communications part 100 in the first embodiment does not set a WEP key so as to perform wireless communications without encryption by WEP. Alternatively, the Wi-Fi communications part 100 may set the WEP key similar to the access point function of typical Wi-Fi to encrypt communications packets for performing communications using Wi-Fi.

The IP attach part 103 is configured to attach an IP address stored in the connecting destination storage 105 to the communications data supplied from the Wi-Fi communications part 100. The connecting destination storage 105 is configured to store in advance an IP address of the connecting destination, which allows the connection of the terminal apparatus 20 by communications via the connection box 10a. The IP address supplied by the connecting destination storage 105 to the IP attach part 103 may be set and changed by an instruction from outside such as an instruction via the PC 30. Note that the connection box 10a itself may have a setting part or a switching part to set or switch the IP address.

FIG. 4 is a table illustrating an example of a data structure of the connecting destination storage 105. The connecting destination storage 105 is designed to hold an IP address of the connecting destination that allows the connection of the terminal apparatus 20. For example, the connecting destination storage 105 stores an IP address of the MFP 51, an IP address of the PJ 52, and an IP address of the TBL 54, and an IP address of the IWB 50, as illustrated in FIG. 4. For example, the IP attach part 103 selects one of the IP addresses stored in the connecting destination storage 105 and attaches the selected IP address to the communications data in accordance with the communications data supplied from the Wi-Fi communications part 100.

FIG. 3 illustrates an example of the connection box 10a embedding the IP attach part 103, the connecting destination storage 105, and the connection manager 106; however, the connection box 10a is not limited to this example. For example, one of or all of the IP attach part 103, the connecting destination storage 105, and the connection manager 106 may be separated from the connection box 10a in the network system 1. The network system 1 may be caused to operate as a server connected to the LAN 40 in cooperation with the connection box 10a.

The LAN I/F 104 is configured to control communications with the LAN 40. The LAN I/F 104 acquires the authentication information stored in the connection manager 106, control open/close (ON/OFF) of the SW part 102, and sends the IP address supplied from the connecting destination storage 105 to the IP attach part 103, in accordance with a request from the connection manager 106.

The LAN I/F 104 transmits the acquired authentication information to the PC 30 when the LAN I/F 104 receives the authentication information from the connection manager 106. The PC 30 subsequently displays the authentication information received from the connection box 10a on a display (DISP) 31.

The LAN I/F 104 opens the SW part 102, deletes the authentication information of the connection manager 106, initializes the Wi-Fi communications part 100 via the connection manager 106, and cuts the connection of the Wi-Fi communications part 100, in accordance with the instructions associated with the connection release from the owner PC 30.

Figure 5:
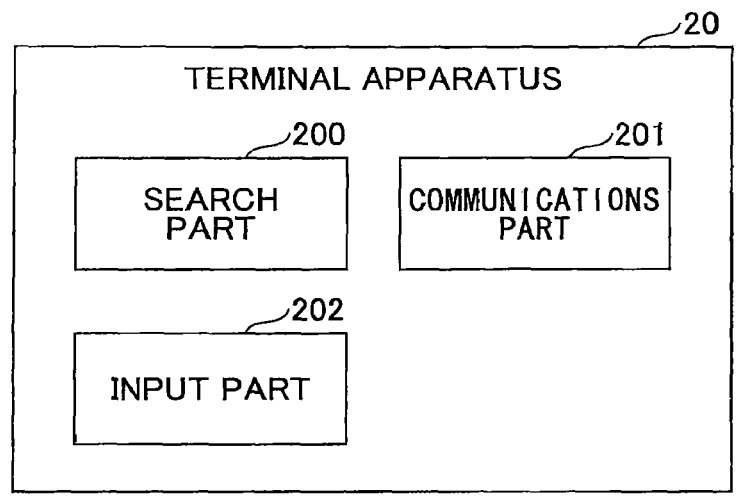
FIG. 5 is a functional block diagram illustrating examples of functions of a terminal apparatus according to the first embodiment.

FIG. 5 is a functional block diagram illustrating examples of functions of the terminal apparatus 20 according to the first embodiment. The terminal apparatus 20 includes a search part 200, a communications part 201, and an input part 202. One of or all of the search part 200, the communications part 201, and the input part 202 are constructed by, but not particularly limited to, programs that operate on a central processing unit (CPU). All of the search part 200, the communications part 201, and the input part 202 may be constructed by independent hardware structures that operate in cooperation with one another.

The search part 200 is configured to search for the access point using Wi-Fi for performing communications via the communications part 201. The communications part 201 is configured to establish connection with the detected access point detected by the search part 200 to perform communications with the connection-established access point. The input part 202 is configured to cause a not-illustrated display part to display a screen including a message that encourages a user to input authentication information, and transfer the authentication information input via the screen to the communications part 201. The communications part 201 may embed an identifier indicating the authentication information being included in the transmission data for transmitting the authentication information input to the input part 202.

Figure 6:
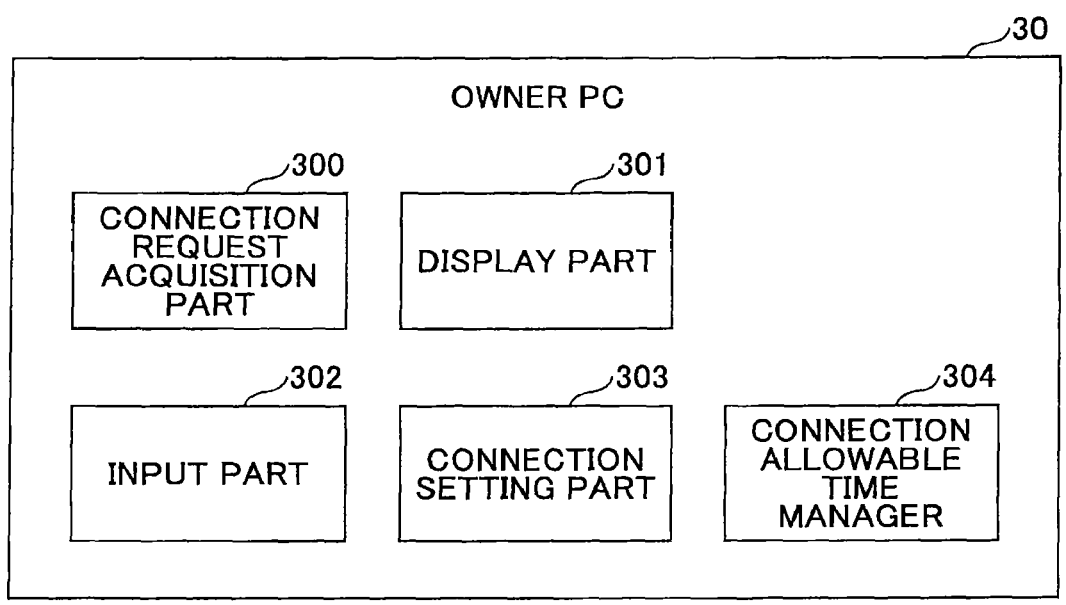
FIG. 6 is a functional block diagram illustrating an example of a PC for an internal user to transmit an instruction to authorize connection of an apparatus of an external user.

FIG. 6 is a functional block diagram illustrating examples of the functions of the PC 30 used by an internal user to give an instruction to allow an apparatus of an external user to connect to the connection box 10a. Note that the PC 30 represents an "owner PC" in FIG. 6. The owner PC 30 includes a connection request acquisition part 300, a display part 301, an input part 302, a connection setting part 303, and a connection allowable time manager 304. The connection request acquisition part 300, the display part 301, the input part 302, the connection setting part 303, and the connection allowable time manager 304 are constructed by, but not particularly limited to, programs that operate on the CPU.

The connection request acquisition part 300 is configured to acquire the authentication information that is input in the terminal apparatus 20 and transmitted from the connection box 10a. The display part 301 is configured to generate a display screen to display the authentication information acquired by the connection request acquisition part 300, and a message that encourages the user to input a connectability instruction of whether to connect the terminal apparatus 20. The input part 302 is configured to receive an input in accordance with the display screen. The connection setting part 303 is configured to send an instruction for closing the SW part 102 of the connection box connection box 10a in accordance with an input into the input part 302 via the display screen.

When the connection setting part 303 receives an instruction to release the connection from the input part 302 of the owner PC 30 or the connection allowable time manager 304, the connection setting part 303 sends to the connection box 10a instructions for opening (OFF) the SW part 102, to delete the authentication information of the connection manager 106, initializing the Wi-Fi communications part 100, and cutting the connection of the Wi-Fi communications part 100, via the LAN I/F 104.

The connection allowable time manager 304 is configured to manage the connection allowable time in accordance with an input of the connection allowable time into the input part 302 via the display screen. When the connection setting part 303 gives an instruction for closing the SW part 102, the connection allowable time manager 304 starts managing the connection allowable time. For example, the connection allowable time manager 304 starts managing the connection allowable time by setting a timer based on the input connection allowable time, or setting an alarm using an end time determined based on the connection allowable time and the current time. When the connection allowable time manager 304 detects that the connection allowable time has elapsed, the connection allowable time manager 304 instructs the connection setting part 303 to release the connection.

Figure 7:
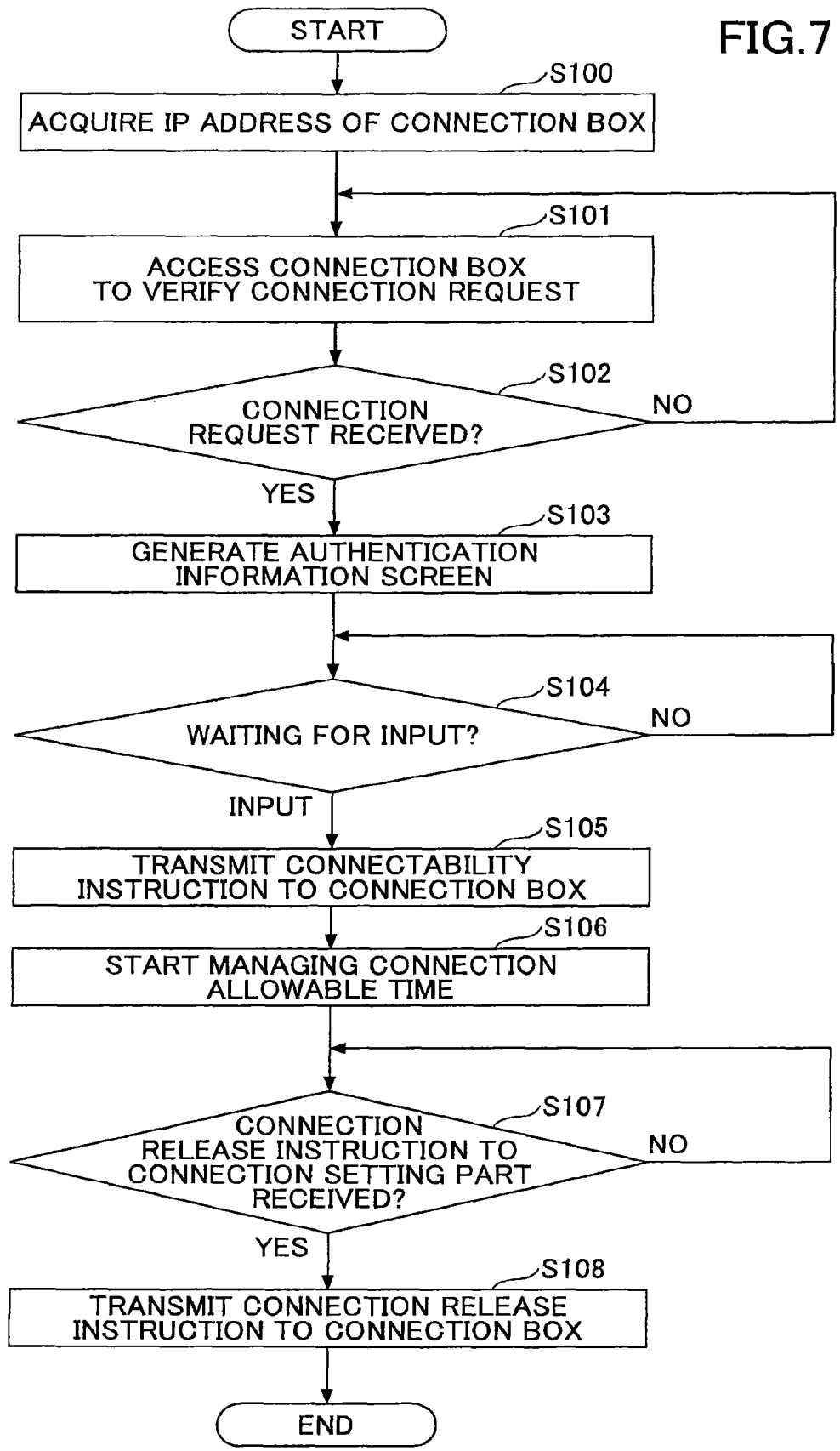
FIG. 7 is a flowchart illustrating an example of a connection authorization process in the PC with respect to the connection box according to the first embodiment.

FIG. 7 is a flowchart illustrating an example of a connection authorization process in the owner PC 30 with respect to the connection box 10a according to the first embodiment. The flowchart process is implemented by programs that operate on the CPU of the owner PC 30.

When the connection box 10a is connected to the LAN 40, the owner PC 30 acquires the IP address of the connection box 10a from the network system 1 including the LAN 40 (step S100). The owner PC 30 subsequently access the connection box 10a in accordance with the acquired IP address to verify the presence or absence of the connection request from the terminal apparatus 20 (step S101). The owner PC 30 subsequently returns to the process of step S101 when the connection box 10a receives no connection request (step S102).

That is, the connection box 10a stores the connection request with the attached authentication information transmitted from the terminal apparatus 20 into memory included in the connection manager 106 within the connection box 10a. The owner PC 30 queries the connection box 10a about the presence or absence of the connection request in step S101. The connection box 10a determines whether the memory of the connection manager 106 stores the connection request in response to the query and reports a determined result to the owner PC 30.

The owner PC 30 moves to a process of step S103 when the connection box 10a determines that the connection box 10a has received the connection request in step S102. The owner PC 30 acquires the authentication information including the connection request with the attached authentication information from the connection box 10a, generates an authentication information display screen for verifying the authentication information, and displays the generated authentication information display screen on the display 31.

For example, the owner PC 30 requests the connection box 10a to provide the authentication information attached to the connection request in step S103. The connection box 10a acquires from the connection manager 106 the authentication information attached to the connection request transmitted from the terminal apparatus 20 and transmits the acquired authentication information to the owner PC 30. The owner PC 30 generates a display screen for displaying the authentication information and a message encouraging the user to input a connectability instruction of whether to connect the terminal apparatus 20, and displays the generated display screen on the display 31.

The owner PC 30 waits to receive from the internal user an input of the connectability instruction of whether to connect the terminal apparatus 20 (step S104). When receiving the connectability instruction from the internal user, the owner PC 30 subsequently transmits an instruction for opening or closing (OF/OFF) the SW part 102 to the connection box 10a (step S105).

When the external user authenticates the authentication information displayed on the authentication information display screen via the display 31, the owner PC 30 specifically receives from the internal user an instruction for closing (ON) the connection between the terminal apparatus 20 and the LAN 40. The owner PC 30 transmits this closing (ON) instruction to the connection box 10a. When the LAN I/F 104 receives the closing (ON) instruction via the connection box 10a, the LAN I/F 104 outputs a signal indicating connection close (ON) (hereinafter called a "connection close (ON) signal").

The owner PC 30 subsequently starts managing the connection allowable time in accordance with the connection allowable time input by the internal user (step S106).

The owner PC 30 subsequently waits for the connection setting part 303 to receive an instruction to release the connection (herein after called a "connection release instruction") from the 302 or the connection allowable time manager 304 (step S107). When the connection setting part 303 receives the connection release instruction, the owner PC 30 subsequently transmits connection release instructions to the connection box 10a to release the connection between the terminal apparatus 20 and the 40 (step S108).

Specifically, the owner PC 30 sends to the connection box 10a the instructions for opening (OFF) the SW part 102, deleting the authentication information of the connection manager 106, initializing the Wi-Fi communications part 100, and cutting the connection of the Wi-Fi communications part 100.

Figure 8:
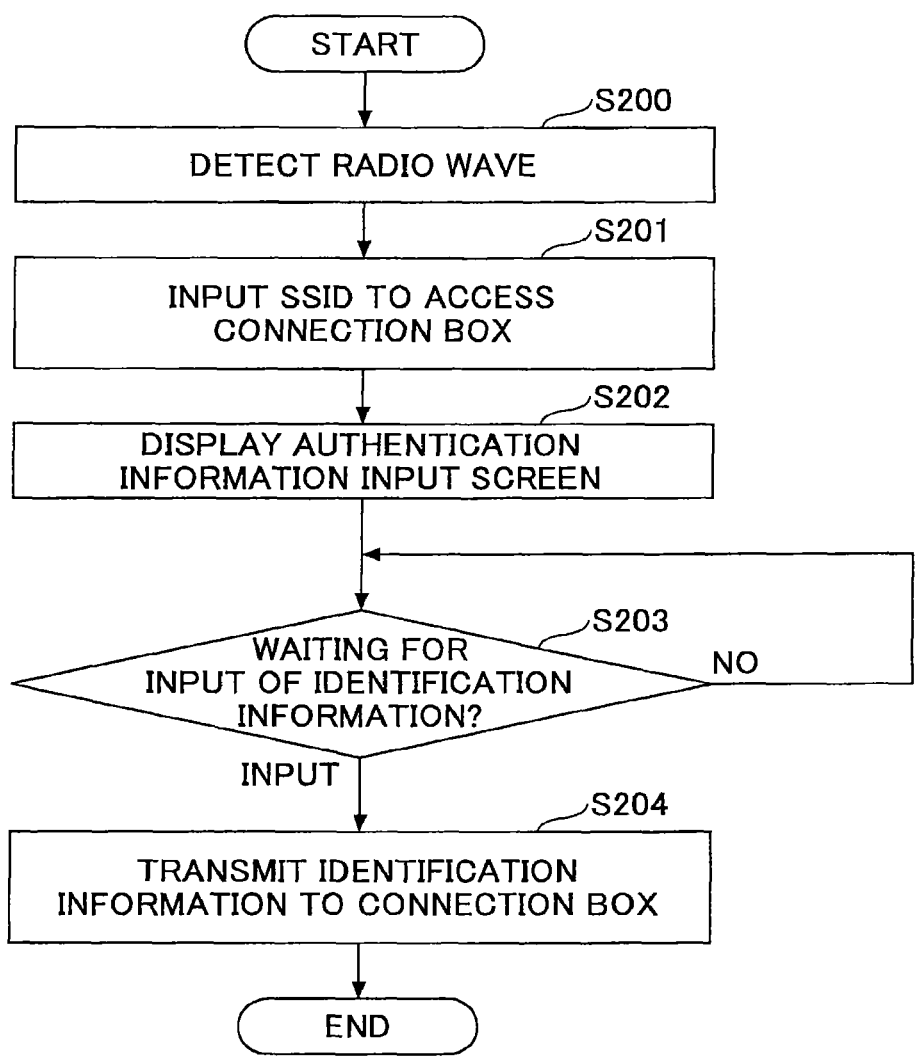
FIG. 8 is a flowchart illustrating an example of a request process of connecting to a LAN by the terminal apparatus in the first embodiment.

FIG. 8 is a flowchart illustrating an example of a request process of connecting to the LAN 40 by the terminal apparatus 20 in the first embodiment. The terminal apparatus 20 detects radio waves of Wi-Fi transmitted from the Wi-Fi communications part 100 of the connection box 10a (step S200). When the terminal apparatus 20 detects the radio waves from the Wi-Fi communications part 100, the terminal apparatus 20 receives from the external user an input of an SSID of the connection box 10a (the Wi-Fi communications part 100) that has been already reported from the internal user to the external user. The terminal apparatus 20 subsequently transmits the received SSID to the connection box 10a to access the connection box 10a (step S201).

The terminal apparatus 20 subsequently generates an authentication information input screen that encourages the external user to input the authentication information, and displays the generated authentication information input screen on a not-illustrated display included in the terminal apparatus 20 (step S202). The terminal apparatus 20 subsequently waits for authentication information input by the external user (step S203). When the authentication information is input by the external user, the terminal apparatus 20 moves to the process of step S204.

The terminal apparatus 20 transmits the authentication information input by the external user to the connection box 10a (step S204). In this step, the terminal apparatus 20 attaches the authentication information to the connection request for connecting to the LAN 40, and transmits the connection request with the attached authentication information to the connection box 10a. The connection box 10a closes the SW part 102 of the connection box 10a to connect the terminal apparatus 20 and the LAN 40 in accordance with authentication made by the internal user based on the transmitted authentication information attached to the connection request.

Note that when receiving the connection release instructions from the owner PC 30, the connection box 10a opens the SW part 102, deletes the authentication information of the connection manager 106, initializes the Wi-Fi communications part 100 via the connection manager 106, and cuts the connection of the Wi-Fi communications part 100.

Figure 9:
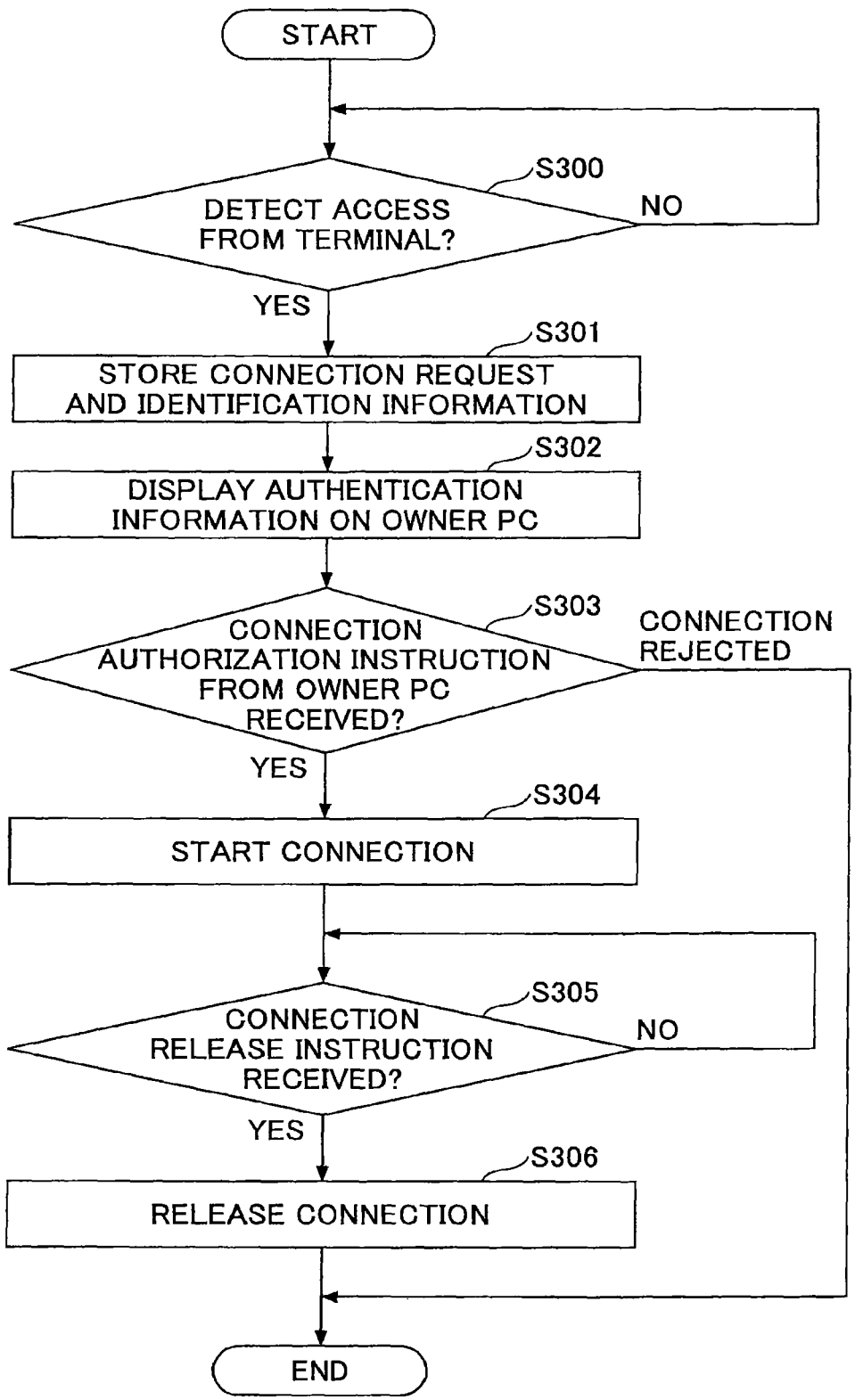
FIG. 9 is a flowchart illustrating an example of a process flow in the connection box according to the first embodiment.

FIG. 9 is a flowchart illustrating an example of a process flow in the connection box 10a in the first embodiment. When detecting an access from the terminal apparatus 20 (step S300), the connection box 10a moves to the process of step S301. The connection box 10a stores the connection request and the authentication information received from the terminal apparatus 20 in memory (step S301). The connection box 10a acquires the authentication information from the memory in accordance with the request from the owner PC 30, and displays the acquired authentication information on the display 31 of the owner PC 30 (step S302).

When the connection box 10a receives a connection allowable instruction from the owner PC 30, the connection box 10a moves to the process of step S304, whereas when the connection box 10a receives a connection rejection instruction from the owner PC 30, the connection box 10a ends the process (step S303). Note that when the connection box 10a receives no connection allowable instruction for a predetermined time, the connection box 10a may end the process as having received the connection rejection instruction.

When the connection box 10a receives the connection allowable instruction from the owner PC 30, the connection box 10a closes the SW part 102 to start connecting the terminal apparatus 20 and the LAN 40 (step S304). When the connection box 10a receives the connection release instruction from the owner PC 30, the connection box 10a moves to the process of step S306, whereas when the connection box 10a receives no connection release instruction from the owner PC 30, the connection box 10a retains the connection (step S305). The connection box 10a subsequently receives the connection release instruction from the owner PC 30, the connection box 10a releases the connection between the terminal apparatus 20 and the LAN 40 (step S306).

Note that the WEP is illustrated as, but not limited to an example of communications security via the wireless LAN in the above-described network system 1 illustrated in FIG. 1. Specifically, Wi-Fi protected access (WPA) or WPA2 that is an extended WPA may instead be used for the communications security via the wireless LAN in the above-described network system 1. However, even in this case, the Wi-Fi communications part 100 in the first embodiment does not set security by WPA to perform wireless communications without encryption by WPA. The Wi-Fi communications part 100 sets security by WPA and performs connection authentication and communications packet encryption to execute communications.

Modification of First Embodiment

Figure 10:
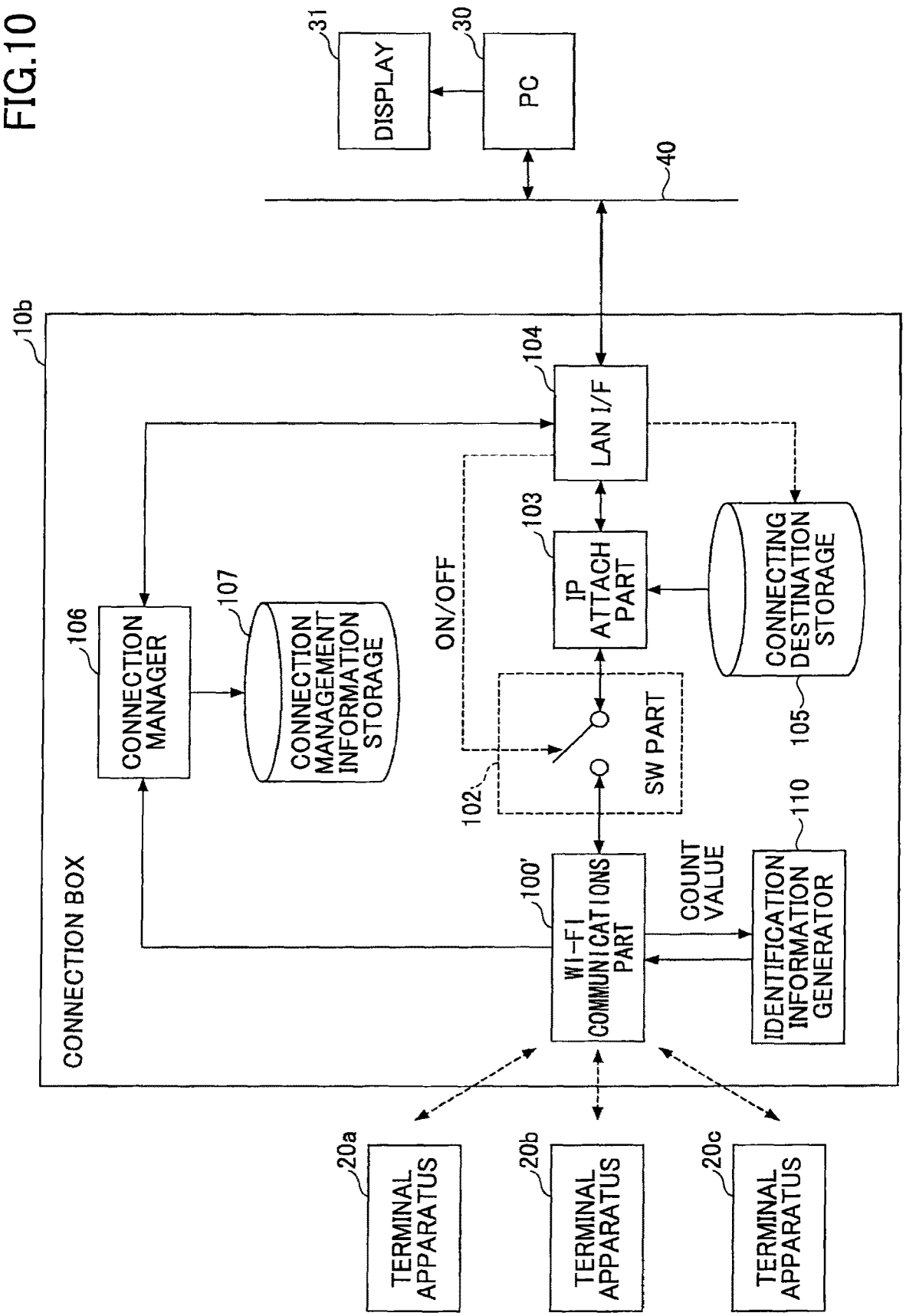
FIG. 10 is a block diagram illustrating a configuration example of a connection box according to a modification of the first embodiment.

FIG. 10 is a block diagram illustrating a configuration example of a connection box 10b according to a modification of the first embodiment. The connection box 10a according to the first embodiment assumes connecting one terminal apparatus 20; however, the connection box 10b according to the modification of the first embodiment is capable of connecting two or more terminal apparatuses (a terminal apparatus 20a, a terminal apparatus 20b, and a terminal apparatus 20c). Note that the components illustrated in FIG. 10 common to those of FIG. 3 are provided with identical reference numbers, and a duplicated illustration of the components is omitted from the specification.

The connection box 10b illustrated in FIG. 10 has the Wi-Fi communications part 100' having a function to output a count value that is incremented every time the connection is established between the connection box 10b and a different terminal apparatus 20 in addition to the function of the above-described Wi-Fi communications part 100. For example, the Wi-Fi communications part 100' outputs a count value "1" to the terminal apparatus 20a, a count value "2" to the terminal apparatus 20b, and a count value "3" to the terminal apparatus 20c when each of the terminal apparatus 20a, the terminal apparatus 20b, and the terminal apparatus 20c establishes the connection with the LAN 40 in this order. Note that in the following, one of the terminal apparatuses is simply represented by a terminal apparatus 20.

The connection box 10b illustrated in FIG. 10 has a configuration of the connection box 10a illustrated in FIG. 3 that further includes an identification information generator 110. The identification information generator 110 is configured to generate different identification information in accordance with the count value output from the Wi-Fi communications part 100'.

The Wi-Fi communications part 100' is configured to acquire an identifier unique to each of the terminal apparatuses 20 such as media access control (MAC) from the corresponding terminal apparatus 20 that has input the SSID and has established the connection with the Wi-Fi communications part 100'. The Wi-Fi communications part 100' increments the count value when the Wi-Fi communications part 100' acquires an identifier differing from the identifier of the terminal apparatus 20 that has already established the connection.

The identification information generator 110 is configured to generate and identification information in accordance with the count value output from the Wi-Fi communications part 100' and the identifier unique to the terminal apparatus 20, and transfers the generated identification information to the Wi-Fi communications part 100'. For example, the identification information generator 110 generates the identification information "MAC address count value of the terminal apparatus 20" using the MAC address and the count value. The Wi-Fi communications part 100' stores the authentication information transmitted from the terminal apparatus 20 in association with the identification information transferred from the identification information generator 110 in a connection management information storage 107 by following an put of the external user.

FIG. 11 is a table illustrating an example of a data structure of the connecting destination storage 107. The connection management information storage 107 is configured to store the authentication information transmitted from the terminal apparatus 20 in association with the identification information transferred from the identification information generator 110. "No." of the table indicates the order of the established connections. "Identification information" indicates identification information of the terminal apparatus 20 that requests connection with the LAN 40. "Authentication information" indicates authentication information output from the terminal apparatus 20. An example of the authentication information may be an image file such as a GIF file.

For example, the connection management information storage 107 associates "MAC address_01 of the terminal apparatus 20a" serving as identification information of the terminal apparatus 20a that has transmitted a first connection request with "identification information (an image) input from the terminal apparatus 20a". Further, the connection management information storage 107 associates "MAC address_02 of the terminal apparatus 20b" serving as identification information of the terminal apparatus 20b that has transmitted a second connection request with "identification information (an image) input from the terminal apparatus 20b". Moreover, the connection management information storage 107 associates "MAC address_03 of the terminal apparatus 20c" serving as identification information of the terminal apparatus 20c that has transmitted a third connection request with "identification information (an image) input from the terminal apparatus 20c".

The owner PC 30 is configured to display the authentication information and the identification information in association with the authentication information stored in the connection management information storage 107 on an identification information display screen via the connection manager 106. The internal user may thus be able to identify the terminal apparatuses 20 to set the connectability with respect to each of the terminal apparatuses 20. Note that the connection box 10b also supplies setting results of the connectability of the terminal apparatuses 20 to the Wi-Fi communications part 100' to filter the transfer data in accordance with the setting results of the connectability.

The connection allowable time manager 304 of the owner PC 30 is configured to transmit individual connection release instructions in accordance with connection allowable times individually set for the terminal apparatus 20a, the terminal apparatus 20b and the terminal apparatus 20c. The connection allowable time manager 304 transmits the following instructions to the terminal apparatus 20 to which a longest connection allowable time has been allocated; the instructions includes an instruction to open the connection between the terminal apparatus 20 and the LAN 40, an instruction to delete the identification information that has been used, and an instruction to cut the connection between the external user and the connection box 10. On the other hand, the connection allowable time manager 304 transmits the following instructions to the terminal apparatus 20 to which connection allowable time other than the longest connection allowable time has been allocated; the instructions include an instruction to open the connection between the terminal apparatus 20 and the LAN 40, and an instruction to delete the identification information that has been used. Specifically, the connection allowable time manager 304 is configured to perform a process such as initializing the connection information stored in the connection manager 106 when the all the connections are open.

Second Embodiment

Next, a description is given of a second embodiment. The second embodiment applies a concept of a software-defined network (SDN) to the above-described connection box 10. The following describes SND prior to illustration of the second embodiment.

The traditional network environment such as an internal organization LAN having a network construction closed within an organization is generally constructed by an assigned engineer who has a thorough knowledge of settings and operations of the LAN switches and wireless LAN access points provided by different vendors. Such a network environment is in a so-called "vendor lock-in" status due to being provided with an authentication system and an operation method by vendor-specific solutions. Thus, it appears difficult for the organization to flexibly set the authentication system or the operation method.

However, so-called software-defined networking "SDN" has recently attracted attention in order to enable organizations serving as users to construct their own unique network constructions. SDN is a concept of networking that allows software alone to control data migration over the network. Typical technical elements associated with the SDC that have attracted attention include "network virtualization" and "OpenFlow", one of protocols (methods) independent of vendors and having open specifications to control the communications over the virtualized network.

The network virtualization is a collection of technologies implementing elements such as a virtual interface technology representing one physical interface as two or more interfaces or two or more physical interfaces as one interface, and a virtual switching technology connecting and relaying the virtual interfaces. The network virtualization separates a logical network configuration from a physical network by combinations of physical network apparatuses and virtual network components and protocol technologies so as to implement a flexible network that is not restricted by physical entities.

OpenFlow handles the communications as an end to end (E2E) flow, and performs channel control, load balancing, and optimization per the E2E flow. Specifically, OpenFlow is not implemented by a decentralized autonomous system to analyze and transfer data packets in relay apparatuses in data communications channels but implemented by a centralized management system.

OpenFlow separates a "control plane" that performs data analysis, determines a transfer destination, and performs determination control from a "data plane" that simply performs physical packet propagation. OpenFlow enables an OpenFlow controller (OFC) managing the control plane to set transfer rules, and an OpenFlow switch (OFS) managing the data plane to transfer packets in accordance with instructions of the OFC. More specifically, the OFS transfers packets in accordance with a flow table held by the OFS and data of the flow table are added overwritten by the OFC. Openflow may be used as a tool for controlling network virtualization using the above-described techniques.

FIG. 12 is a block diagram illustrating a configuration example of a connection box 10c according to the second embodiment. Note that the components illustrated in FIG. 12 common to those of FIGS. 1 and 3 are provided with identical reference numbers, and a duplicated illustration of the components is omitted from the specification. Note that a server 70 is configured to manage communications over the LAN 40. Apparatuses connected to the LAN 40 that have been authenticated by the server 70 are allowed to perform communications via the LAN 40.

As illustrated in FIG. 12, the connection box 10c includes a Wi-Fi communications part 100c, a LAN I/F 400, a connection manager 401, a transfer controller 402, a transfer control table 403, and a transfer processor 404. The LAN I/F 400 corresponds to the LAN I/F 104 of FIG. 3, and is configured to control communications with the LAN 40. The LAN I/F 400 also transmits and receives data between the transfer processor 404, the connection manager 401, and the transfer controller 402.

The Wi-Fi communications part 100c corresponds to the Wi-Fi communications part 100 illustrated in FIG. 3. The Wi-Fi communications part 100c basically includes access point function with Wi-Fi and is configured to perform wireless communications with Wi-Fi. The Wi-Fi communications part 100 is configured to be identified by a predetermined SSID. The Wi-Fi communications part 100c includes a SW part 410 configured to on/off control the communications with Wi-Fi. Note that the SW part 410 represents only a function of on/off controlling the communications and does not represent a specific configuration.

The connection manager 401 is configured to function as a host access point with respect to the Wi-Fi communications part 100c. The connection manager 401 is configured to transfer or receive a key with the Wi-Fi communications part 100c via WPA in accordance with instruction received from the owner PC 30 to control the communications with respect to the LAN 40 via the Wi-Fi communications part 100c. For example, the connection manager 401 transmits a key with respect to the Wi-Fi communications part 100c via WPA in accordance with instructions from the owner PC 30. The Wi-Fi communications part 100c performs authentication via WPA using the received key and switches on (closes) the SW part 410 to enable the communications with the LAN 40 via the Wi-Fi communications part 100c.

The transfer controller 402 corresponds to the above-described OFC, and is configured to generate transfer control information including information indicating a condition of a packet subject to processing and a transfer destination of the packet and write the generated transfer control information in the transfer control table 403, in accordance with the instruction received from the owner PC 30. The transfer processor 404 is configured to relay packets between the Wi-Fi communications part 100c and the LAN I/F 400. The transfer processor 404 corresponds to the above-described OFS, and is configured to control behavior of the relaying packets in accordance with the transfer control information read from the transfer control table 403.

FIG. 13 is a table illustrating an example of a data structure of the transfer control table 403. The transfer control table 403 includes transfer destinations corresponding to conditions of packets received from the terminal apparatuses 20. An "IP address of a transmission source" indicates an IP address of a transmission source stored in a header part of the received packet. An "IP address of a transmission destination" indicates an IP address of a transmission destination stored in the header part of the received packet. Note that the "IP address of the transmission source" and the "IP address of the transmission destination" are both included in a packet transfer condition. An "action" indicates a process performed on the received packet.

For example, when the header part of the received packet includes an "IP address of the terminal apparatus 20" as the IP address of the transmission source and an "IP address of the MFP 51" as the IP address of the transmission destination, the transfer controller 402 transfers the packet to the MFP 51 based on a first line record of the transfer control table 403. Similarly, when the header part of the received packet includes an "IP address of the terminal apparatus 20" as the IP address of the transmission source and an "IP address of the PJ 52" as the IP address of the transmission destination, the transfer controller 402 transfers the packet to the PJ 52 based on a second line record of the transfer control table 403. Note that when the transfer controller 402 receives a packet that does not match any of the conditions of the transfer control table 403, the transfer controller 402 reports an error to the terminal apparatus 20 and may then execute a process such as dropping or discarding the packet.

Note that the packet transfer conditions are not limited to those described above, and may, for example, also include conditions such as a "MAC address of the transmission source", a "MAC address of the transmission destination", a "port number of the transmission source", and a "port number of the transmission destination". Further, the "action" may also include a process other than transferring the packet to the IP address of the transfer destination.

The LAN I/F 400 deletes the transfer control information written in the transfer control table 403 via the transfer controller 402, initializes the Wi-Fi communications part 100c via the connection manager 401, and switches off the SW part 410 of Wi-Fi communications part 100c. in accordance with an instruction from the connection setting part 303 of the owner PC 30 along with the connection release.

Figure 14:
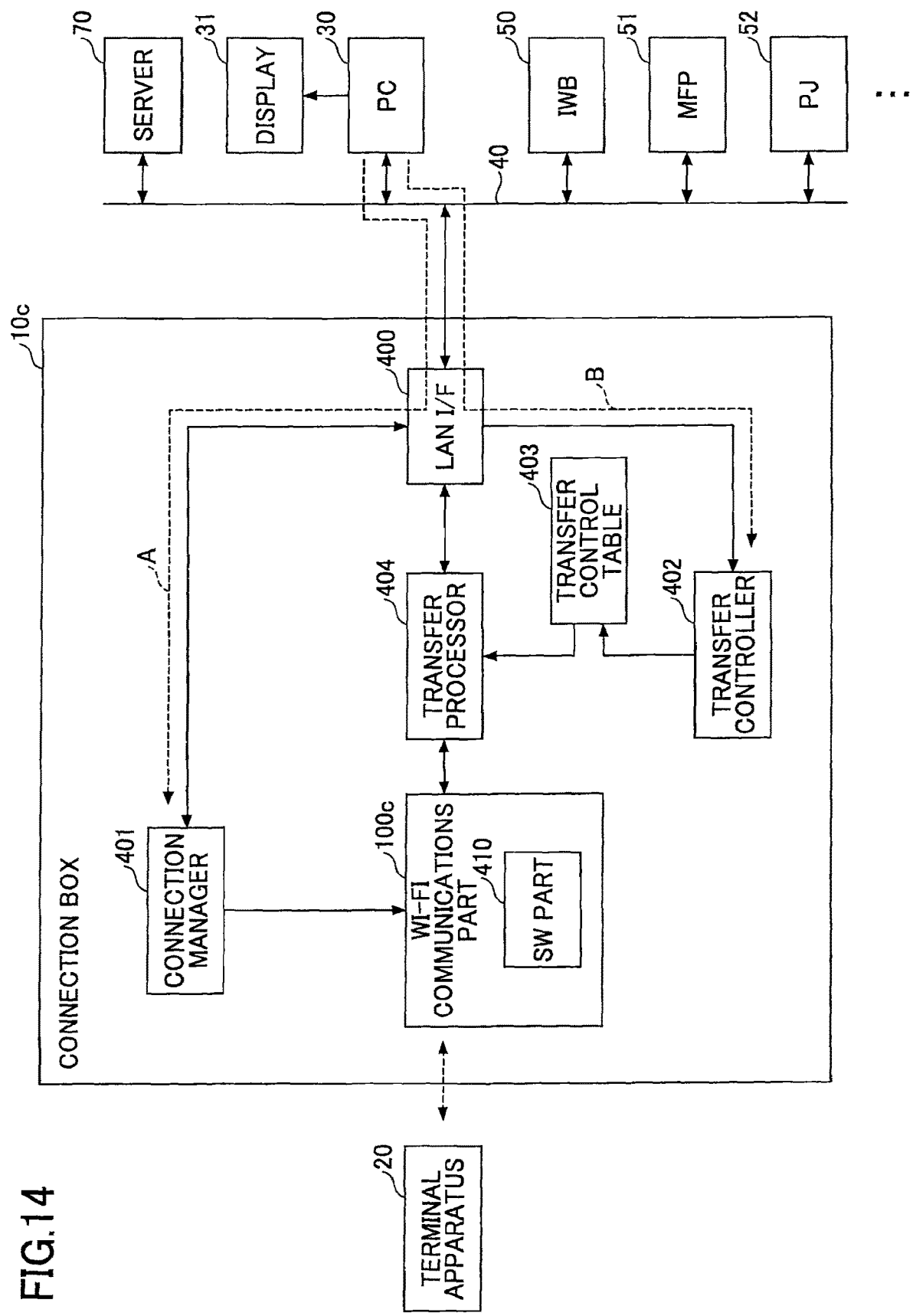
FIG. 14 is a block diagram illustrating a configuration example of a process flow in the connection box according to the second embodiment.

FIG. 14 is a block diagram illustrating an example of a process flow in the connection box according to the second embodiment. The following illustrates communications performed using a connection box 10c with reference to FIGS. 14 to 18 and FIG. 2.

The internal user initially establishes a connection between the owner PC 30 and the connection box 10c, for example. For example, the internal user of the owner PC 30 accesses the server 70 to request the connection to the connection box 10c. The server 70 presents a connection screen for establishing the connection to the connection box 10c to the owner PC 30 in response to the request from the owner PC 30.

Figure 15:
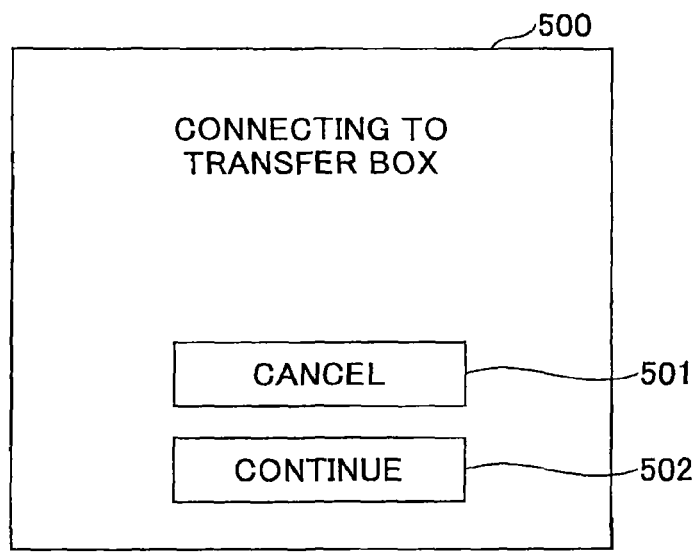
FIG. 15 is a diagram illustrating an example of a connection screen for connecting to the connection box.

FIG. 15 is a diagram illustrating an example of the connection screen 500 for connecting to the connection box 10c. As illustrated in FIG. 15, the connection screen 500 includes a button 501 for cancelling the connection to the connection box 10c, and a button 502 for continuing a connection process to connect to the connection box 10c. The owner PC 30 transmits information indicated by the operated button 501 or 502 to the server 70.

Figure 16:
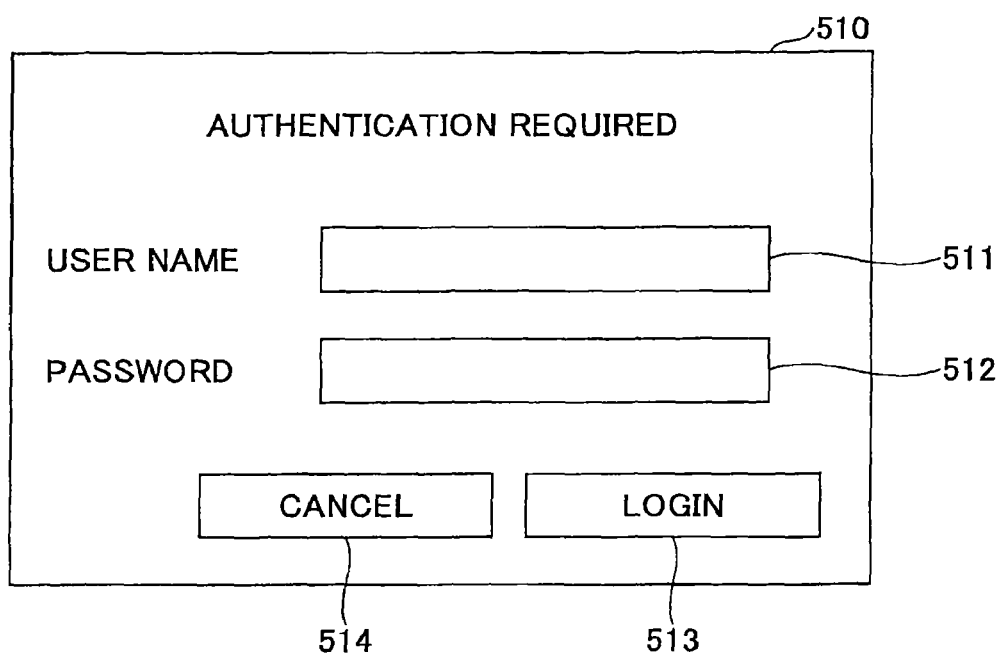
FIG. 16 is a diagram illustrating an example of a login screen for connecting to the connection box.

FIG. 16 is a diagram illustrating an example of a login screen for connecting to the connection box 10c. When the server 70 receives the information indicating an operation corresponding to the button 502 from the owner PC 30, the server 70 presents a login screen 510 illustrated in FIG. 16 to the owner PC 30. The login screen 510 includes an input part 511 for inputting a user name and an input part 512 for inputting a password. The login screen 510 further includes a button 513 for transmitting information input into the input part 511 and the input part 512 to the server 70. The login screen 510 further includes a button 514 for cancelling the connection process to connect to the connection box 10c.

When the server 70 receives the user name and the password input via the login screen 510 from the owner PC 30, the server 70 performs an authentication process in accordance with the received user name and password. When the authentication has succeeded, the server 70 establishes a connection between the owner PC 30 and connection box 10c via the LAN 40.

When the connection between the owner PC 30 and the connection box 10c is established, the owner PC 30 displays on the display 31 an apparatus specifying screen 520 for specifying a desired one of apparatuses to allow the terminal apparatus 20 to have a connection via the connection box 10c. The owner PC 30 may display on the display 31 the apparatus specifying screen 520 presented by the server 70.

Figure 17:
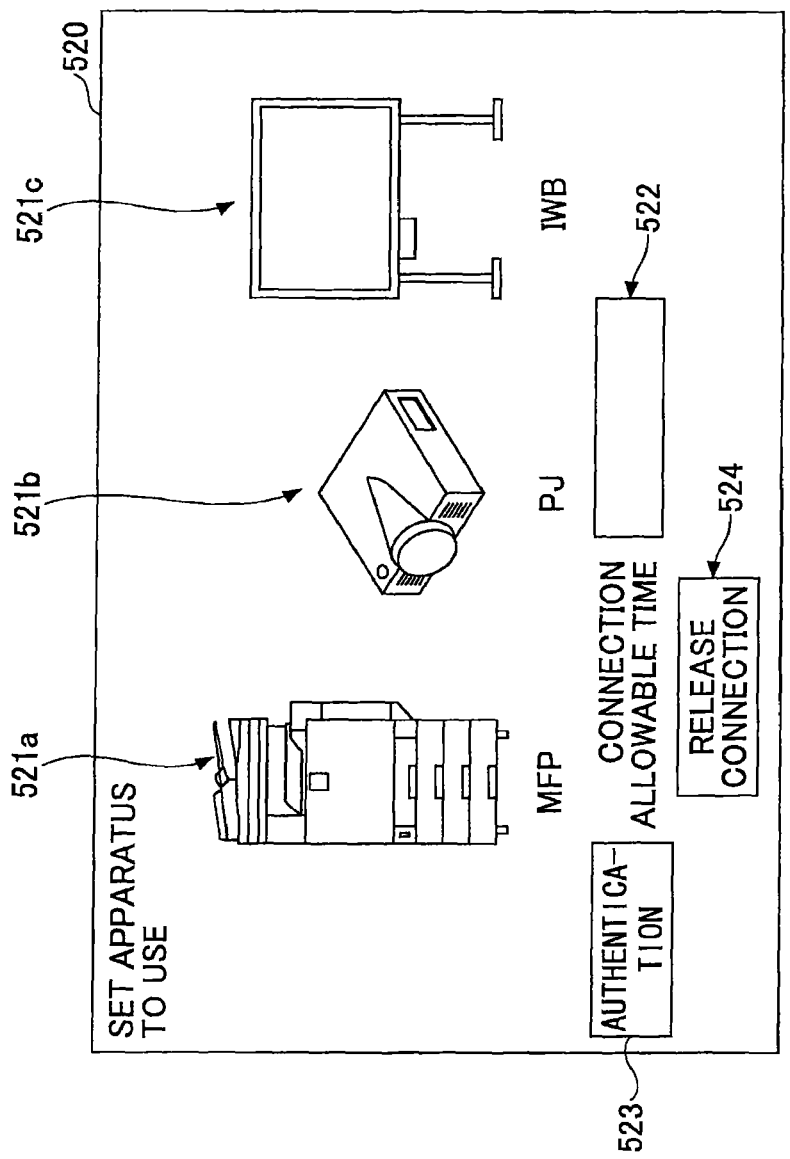
FIG. 17 is a diagram illustrating an example of an apparatus specifying screen according to the second embodiment.

FIG. 17 is a diagram illustrating an example of the apparatus specifying screen 520 according to the second embodiment. As illustrated in FIG. 17, the apparatus specifying screen 520 displays connectable apparatuses MFP 51, PJ 52, and IWB 50 as icon images 521a, 521b and 521c, respectively. The apparatus specifying screen 520 is not limited to this example. The owner PC 30 may display a list of character strings (text data) relating to the connectable apparatuses on the apparatus specifying screen 520.

When the internal user selects a desired one of the icon images 521a, 521b, and 521c, subsequently inputs a connection allowable time into a connection allowable time field 522, and then presses an authentication button 523, the owner PC 30 transmits transfer control information of the apparatus corresponding to the selected icon image to the connection box 10c. Further, the connection allowable time manager 304 starts managing the connection allowable time.

Note that the owner PC 30 is assumed to store the transfer control information for each of the apparatuses. Alternatively, the server 70 may store the transfer control information for each of the apparatuses. In such a case, the owner PC 30 may acquire the transfer control information for each of the apparatuses by querying the server 70. The owner PC 30 may allow the internal user to select two or more of the icon images 521a, 521b, and 521c, and transfer control information of two or more apparatuses may be transmitted to the connection box 10c.

The connection box 10c transfers the transfer control information transmitted from the owner PC 30 to the transfer controller 402 (see a route B indicated by a broken line in FIG. 14). The transfer controller 402 writes the transferred transfer control information into the transfer control table 403.

On the other hand, the terminal apparatus 20 transmits to the connection box 10c an SSID reported in advance for establishing a connection to the Wi-Fi communications part 100c (see step S10 in FIG. 2). Note that the access point function of the connection box 10c does not need to perform encryption via such as WPA in a manner similar to the first embodiment. In such a case, the terminal apparatus 20 may be able to establish a connection to the connection box 10c by transmitting a predetermined SSID to the connection box 10c.

Note that in this step, the authentication is not performed by WPA in the Wi-Fi communications part 100c. Thus the SW part 410 of the Wi-Fi communications part 100c is open (off), indicating that the terminal apparatus 20 fails to access the apparatuses connected via the LAN 40.

The external user of the terminal apparatus 20 receives an input of identification information reported in advance from the internal user. In this case, the Wi-Fi communications part 100c may have a captive portal function to forcefully refer to the identification information input screen over the server 70 via the connection manager 401, which allows the terminal apparatus 20 to display on a display panel an identification information input screen 530 transmitted from the Wi-Fi communications part 100c.

Figure 18:
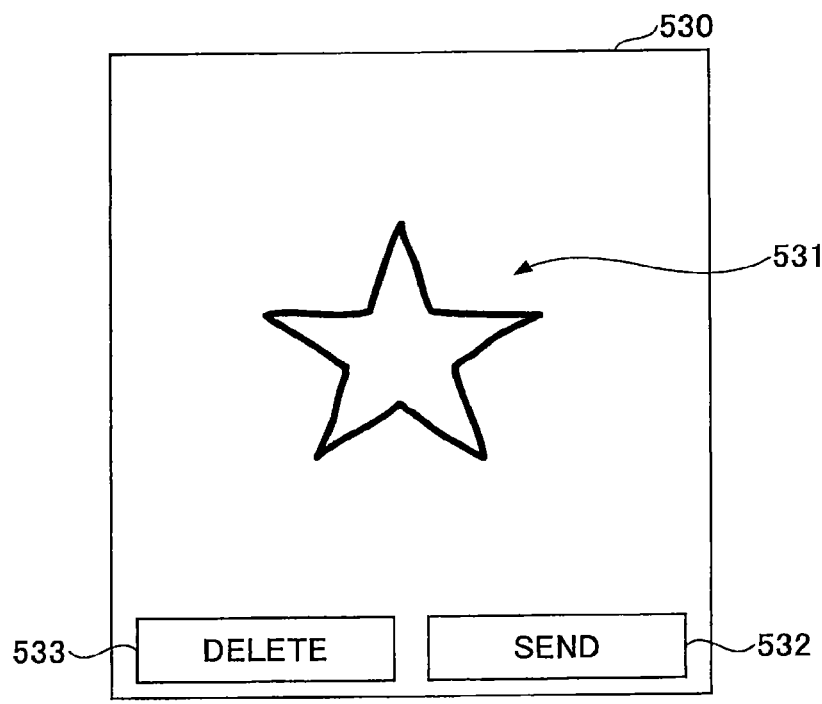
FIG. 18 is a diagram illustrating an example of an identification information input screen according to the second embodiment.

FIG. 18 is a diagram illustrating an example of the identification information input screen 530 according to the second embodiment. As illustrated in FIG. 18, the identification information input screen 530 includes a drawing area 531 in which drawing may be performed. The external user performs drawing reported in advance from the internal user in the drawing area 531. The drawing may be, but not particularly specified, pictures, characters, or symbols insofar as they are commonly recognized between the external user and the internal user. When the button 532 is operated in the identification information input screen 530, the terminal apparatus 20 may, for example, transmit an image within the drawing area 531 to the owner PC 30. The owner PC 30 receives the transmitted image and displays the received image on the display 31.

Note that the external user operates the button 533 in the identification information input screen 530 to delete the drawing content of the drawing area 531. The terminal apparatus 20 receives an input via the identification information input screen 530 not specifically limited to the drawing but may receive an input of the character string (text data) as identification information.

The internal user of the owner PC 30 makes a determination result as to whether the identification information displayed on the display 31 is correct. When the internal user determines that the identification information is correct, the owner PC 30 transmits the connection allowable information indicating the connection being allowed to the connection box 10c to report the connection being allowed in step S12 of FIG. 2.

The connection box 10c transfers the connection allowable information received from the owner PC 30 to the connection manager 401 in accordance with a route A indicated by a broken line in FIG. 14. The connection manager 401 transfers a key via WPA to the Wi-Fi communications part 100c in accordance with the connection allowable information. The Wi-Fi communications part 100c performs an authentication process via WPA using the key transferred from the connection manager 401, and switches on (closes) the SW part 410. The terminal apparatus 20 is thus connected to the LAN 40 via the connection box 10c. The connection box 10c has already been authenticated by the LAN 40. Hence, the terminal apparatus 20 may be able to access apparatuses connected to the LAN 40 via the connection box 10c (step S13 in FIG. 2).

Note that the connection box 10c allows the transfer processor 404 to relay the communications from the terminal apparatus 20 to the LAN 40 in this example. Specifically, the transfer processor 404 controls the communications from the terminal apparatus 20 to the apparatuses connected via the LAN 40 in accordance with the transfer control information stored in the transfer control table 403. For example, when the transfer control information corresponding to the IWB 50 is stored in the transfer control table 403, and the transfer processor 404 receives a packet having a destination being the IWB 50, the transfer processor 404 sets the IWB 50 as a transmission destination of the packet. Note that when a packet having a destination being the MFP 51 is transmitted from the terminal apparatus 20 but the internal user does not desire to allow the external user to use the MFP 51, the transfer processor 404 may change the transmission destination of the packet to the IWB 50.

In the second embodiment, the OpenFlow is applied to the system of the first embodiment. Hence, the system of the second embodiment may flexibly and simply be a system that enables an internal person inside the organization to determine whether to allow the connection between the terminal apparatus 20 and the LAN 40 based on identification information reported in advance to the internal person, which is input by a person outside the organization.

Modification of Second Embodiment

Next, a description is given of a modification of the second embodiment. In the second embodiment, one housing includes the Wi-Fi communications part 100*c*, the LAN I/F 400, the connection manager 401, the transfer controller 402, the transfer control table 403, and the transfer processor 404 forming the connection box 10*c*. However, the configuration of the connection box 10*c* is not limited to this example. That is, one or more of the Wi-Fi communications part 100*c*, the LAN I/F 400, the connection manager 401, the transfer controller 402, the transfer control table 403, and the transfer processor 404 may be separately constructed.

Figure 19:
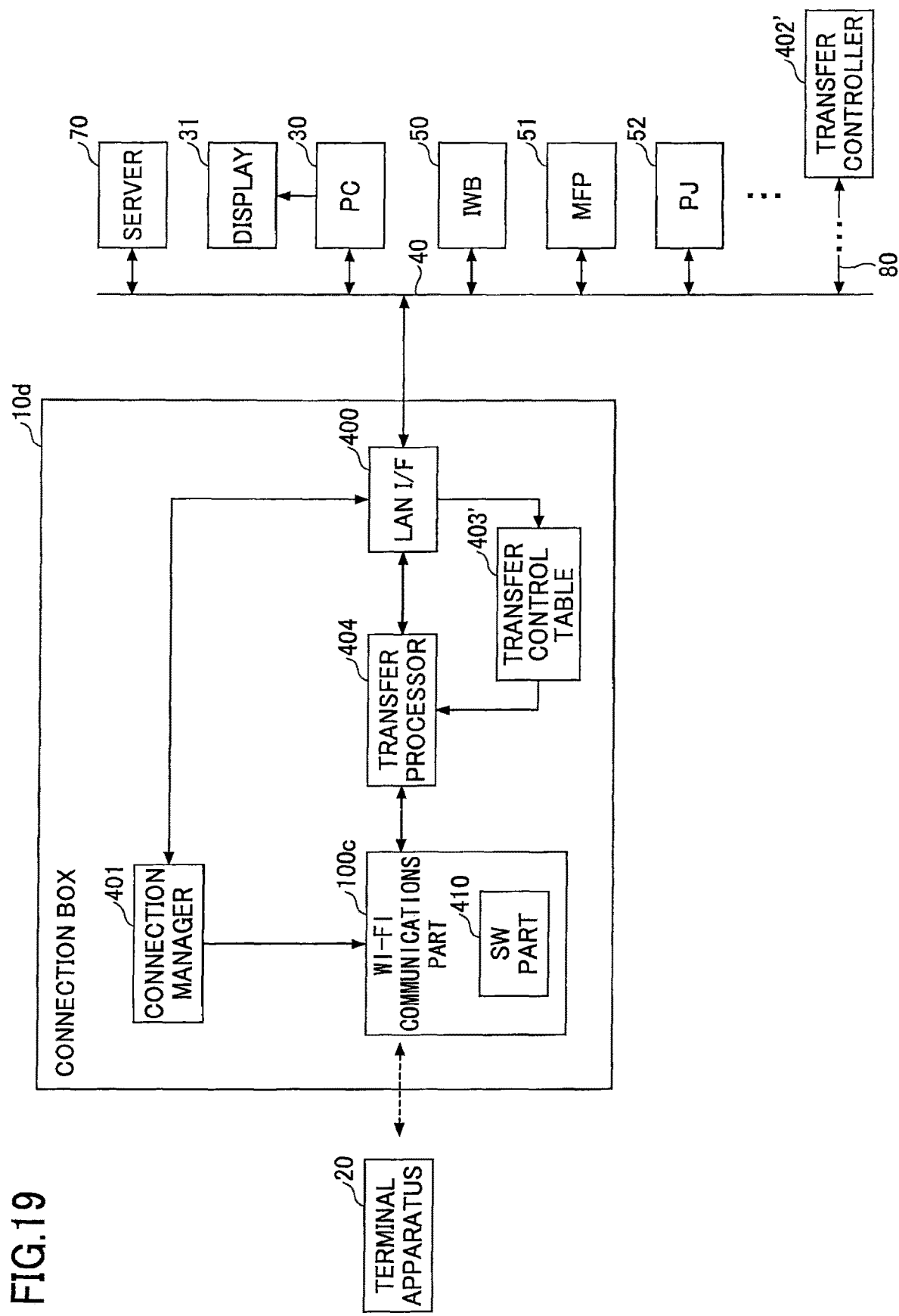
FIG. 19 is a block diagram illustrating a configuration example of a communications system according to a modification of the second embodiment.

FIG. 19 is a block diagram illustrating a configuration example of a communications system according to a modification of the second embodiment. FIG. 19 illustrates a configuration of a connection box 10*d* from which the transfer controller 402 is separated. Note that the components illustrated in FIG. 19 common to those of FIG. 12 are provided with identical reference numbers, and a duplicate explanation of the components is omitted from the specification.

As illustrated in FIG. 19, the connection box 10*d* includes the Wi-Fi communications part 100*c*, the LAN I/F 400, the connection manager 401, a transfer control table 403' and the transfer processor 404. A transfer controller 402' may be constructed over a different network 80 connected to the LAN 40, for example. The transfer controller 402' may be constructed within one server apparatus or may be composed of one or more information processing apparatuses in a distributed manner over an information processing system.

In this case, the transfer controller 402' receives an instruction from the owner PC 30 via the LAN 40 and the network 80, and generates transfer control information in accordance with the received instruction. The transfer controller 402' transmits generated transfer control information via the network 80 and the LAN 40 to the connection box 10*d*. The transfer control information transmitted from the transfer controller 402' is written in the transfer control table 403' via the LAN I/F 400 in the connection box 10*d*.

Thus, the connection box 10*d* according to the modification of the second embodiment may be partially separated by applying the SDN concept to the communications system of the embodiments, thereby implementing a flexible design of the system configuration and reducing cost of the connection box.

The following illustrates a hardware configuration of each of apparatuses constituting a network system 1.

Figure 20:
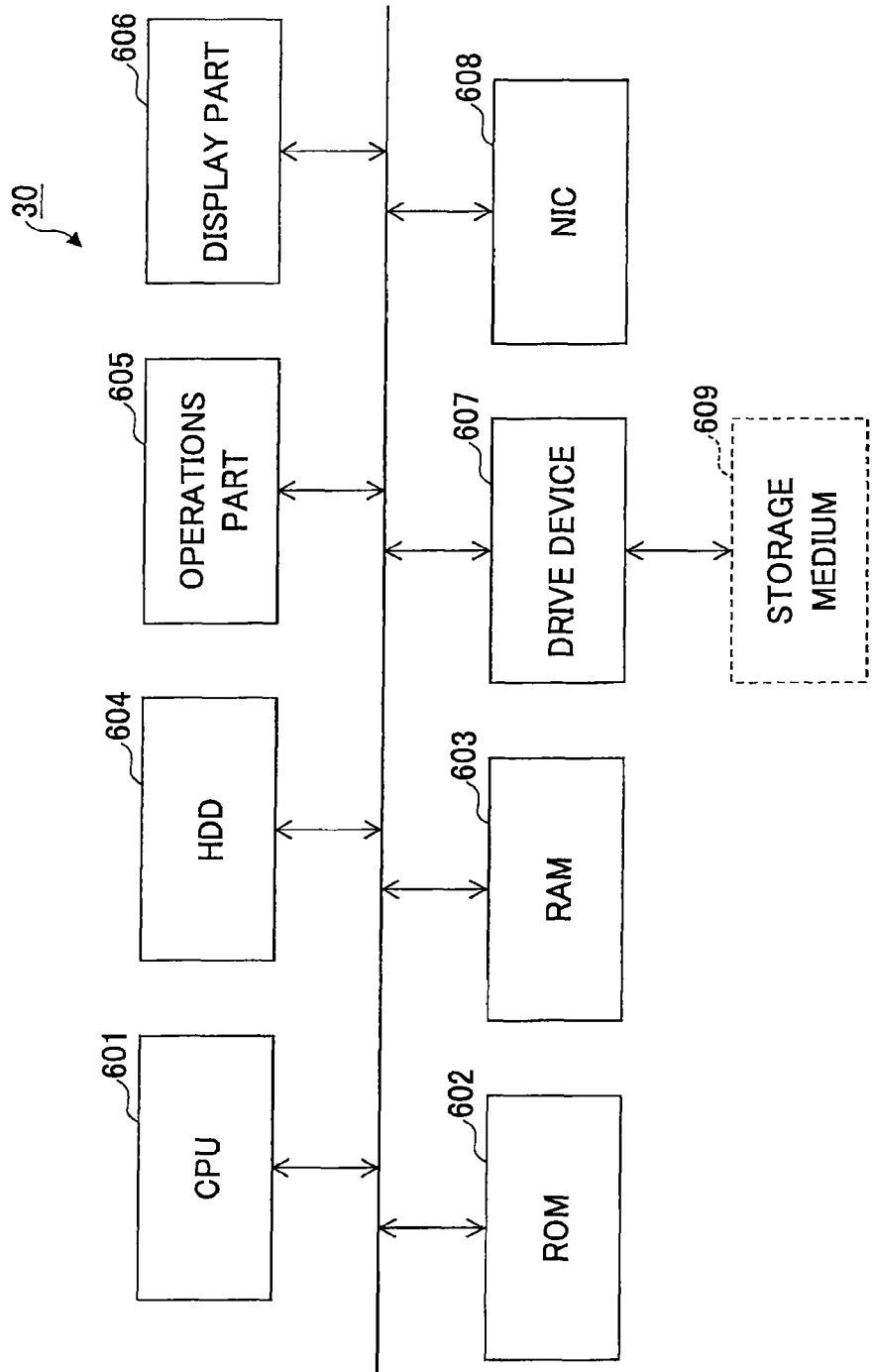
FIG. 20 is a diagram illustrating a hardware configuration example of an owner PC.

FIG. 20 is a diagram illustrating a hardware configuration of an owner PC 30. The owner PC includes a CPU 601, a ROM 602, a RAM 603, an HDD 604, an operations part 605, a display part 606, a drive device 607, a network interface card (NIC) 608, and a storage medium 609.

The CPU 601 serves as a processor configured to perform overall control of the owner PC 30. That is, the CPU 601 implements functions of the connection request acquisition part 300, the display part 301, the input part 302, the connection setting part 303, and the connection allowable time manager 304 illustrated in FIG. 6. The CPU 601 is configured to execute programs such as an operating system stored in the HDD 604 or the like, applications, and various services to implement various types of functions of the owner PC 30. The ROM 602 is configured to store various programs and data used by the programs. The RAM 603 serves as a storage area or the like for loading the programs, or as a working area for the loaded programs. The HDD 604 is configured to store various information, programs, and the like.

The operations part 605 is hardware configured to receive input operations from the user. Examples of the operations part 605 include a keyboard, a mouse, and a touch panel.

The display part 606 is hardware configured to perform display to the user. Examples of the display part 606 include a monitor, a liquid crystal display, and the like. The DISP 31 illustrated in FIG. 3 or the like is an example of the display part 606.

The drive device 607 is configured to read programs from the storage medium 609 recording the programs. The programs read by the drive device 607 may, for example, be installed in the HDD 604. The NIC 608 serves as a communications interface configured to connect the owner PC 30 to the LAN 40 to perform data transmission and reception.

Note that the storage medium 609 indicates a non-transitory storage medium. Examples of the storage medium 609 include a magnetic storage medium, an optical disk, a magnetooptical storage medium, and a nonvolatile memory.

Figure 21:
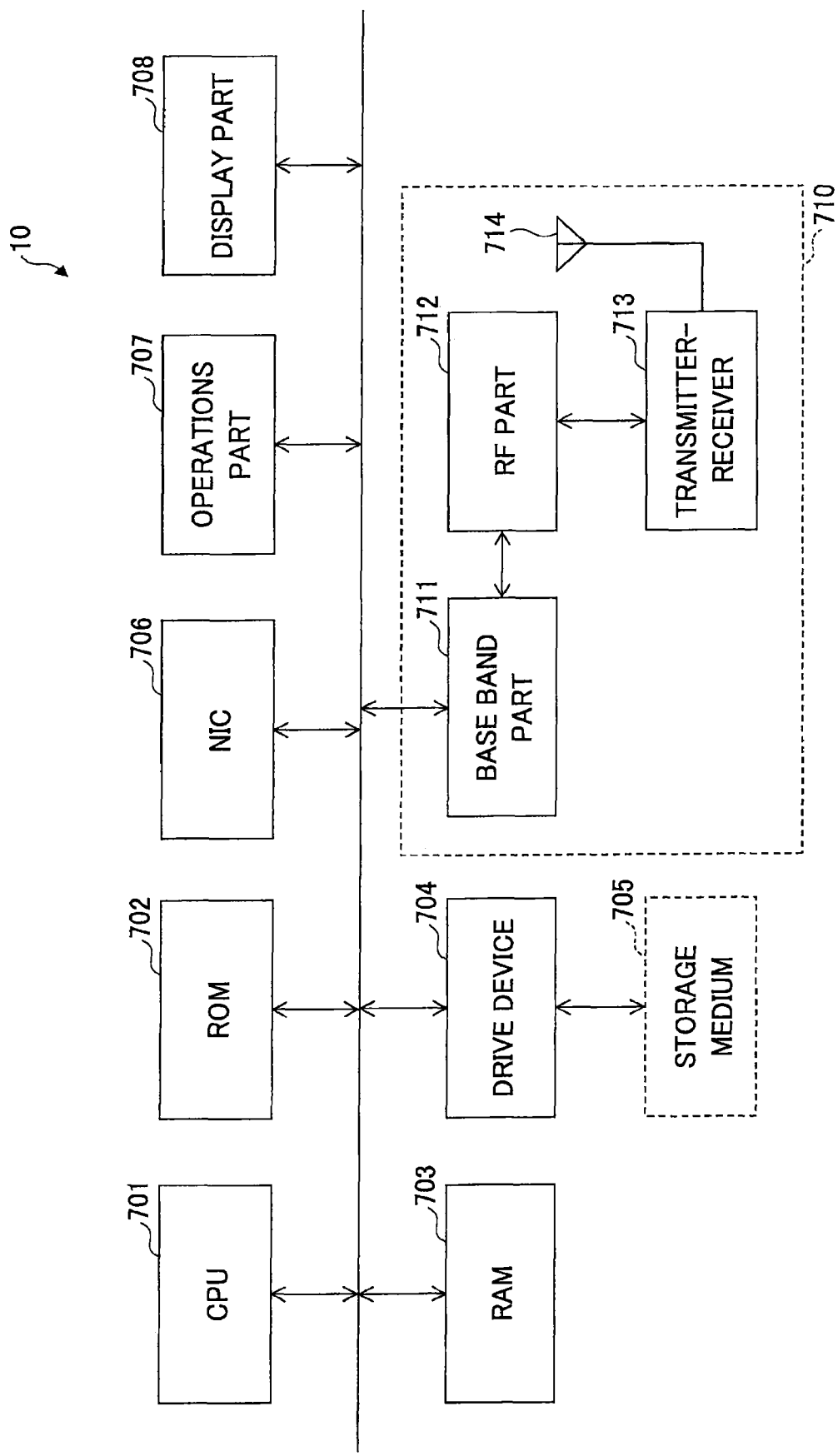
FIG. 21 is a diagram illustrating a hardware configuration example of the connection box.

FIG. 21 is a diagram illustrating a hardware configuration of the connection box 10. The connection box 10 includes a CPU 701, a ROM 702, a RAM 703, a drive device 704, a storage medium 705, a network interface card (NIC) 706, an operations part 707, a display part 708, and a wireless I/F 710.

The CPU 701 serves as a processor configured to perform overall control of the connection box 10. The CPU 701 implements respective functions of processors of the connection box 10. That is, the CPU 701 implements functions of the Wi-Fi communications part 100, the SW part 102, the IP attach part 103, the LAN I/F 104, the connecting destination storage 105, and the connection manager 106 illustrated in FIG. 3.

The ROM 702 is configured to store various programs and data used by the programs. The RAM 703 serves as a storage area or the like for loading the programs or a working area for the loaded programs.

The drive device 704 is configured to read programs or data stored in the storage medium 705. Setting the storage medium 705 recording the programs in the drive device 704 may load the programs in the RAM 703 from the storage medium 705 via the drive device 704. Examples of the storage medium 705 include a magnetic storage medium, an optical disk, a magnetooptical storage medium, and a nonvolatile memory.

The NIC 706 is connected the LAN 40 to be used when the connection box 10 performs communications with another apparatus. The NIC 706 is an example of the LAN I/F 104.

An operations part 707 is configured to receive various types of inputs from the user such as switching ON/OFF of the power of the connection box 10, or operations settings of the connection box 10. A display part 708 is configured to display an operating status of the connection box 10.

The wireless I/F 710 includes a baseband part 711, an RF part 712, a transmitter-receiver 713, and an antenna 714. The baseband part 711 is configured to perform conversion between digital data and electric signals. Note that the digital data are formed of IP packet transmitted to or received from the terminal apparatus 20 via wireless communications. The RF part 712 is configured to perform conversion between a frequency of the electric signals generated by the baseband part 711 and a frequency of the wireless radio. The transmitter-receiver 713 is configured to amplify electric power of wireless radio generated by the RF part 712. The transmitter-receiver 713 also amplifies the received radio to transfer the amplified radio to the RF part 712. The antenna 714 is configured to transmit or receive radio. The wireless I/F 710 is an example of the Wi-Fi communications part 100.

The embodiments and modification may provide effects of allowing an information processing apparatus of an outside user who is outside an organization to easily connect to an internal organization network while assuring security.

The present invention is not limited to the specifically disclosed embodiments modifications, and variations and modifications may be made without departing from the scope of the present invention.

The present application is based on and claims the benefit of priority of Japanese Priority Application No. 2015-085713 filed on Apr. 20, 2015, the entire contents of which are hereby incorporated herein by reference.

What is claimed is:

1. A communications system, comprising:
  a first communications transceiver configured to perform communications with a terminal apparatus;
  a second communications transceiver configured to perform communications via a network;
  a connection circuit configured to:
    establish or release a connection between the first communications transceiver and the second communications transceiver;
    generate management information for managing the connection between the first communications transceiver and the second communications transceiver, the management information including authentication information transmitted from the terminal apparatus and also including identification information;
    store the generated management information in a management information storage; and
    delete at least the authentication information included in the management information relating to the connection when the connection is released;
  a display configured to display the authentication information transmitted from the terminal apparatus;
  a user interface configured to receive an input from a user; and
  a connection manager circuit configured to:
    manage a time that the user is permitted to connect to the network, in accordance with an instruction input by the user and whether or not the authentication information displayed by the display matches previously reported authentication information.

2. The communications system as claimed in claim 1, wherein the connection manager circuit controls the connection circuit to maintain the connection until the time has elapsed, and to release the connection when the time has elapsed.

3. The communications system as claimed in claim 1, further comprising:
  a connecting destination storage configured to store connecting destination information indicating a connecting destination with which the terminal apparatus is capable of performing communications via the network; and
  an attaching circuit configured to attach the connecting destination information as a destination of information transmitted from the terminal apparatus to the network when the connection circuit starts the connection to allow the terminal apparatus to perform communications via the network.

4. The communications system as claimed in claim 3, wherein the connecting destination storage is configured to store an Internet Protocol (IP) address of the connecting destination.

5. The communications system as claimed in claim 3, wherein the connection destination is at least one of a multi-functional printer (MFP), a projector, and an interactive white board (IWB) located within the network.

6. The communications system as in claim 1, wherein
  the connection circuit controls the management information storage to hold management information including identification information of the terminal apparatus to perform communications with the first communications transceiver, and
  the display displays the authentication information transmitted from the terminal apparatus and identification information included in the management information corresponding to the terminal apparatus.

7. The communications system as claimed in claim 1, wherein the first communications transceiver transmits and receives wireless communications, and the second communications transceiver transmits and receives wired communications.

8. A communications method performed by a communications system that includes a first communications transceiver configured to perform communications with a terminal apparatus; a second communications transceiver configured to perform communications via a network; a connection circuit; a display; a user interface; and a connection manager circuit, the communications method comprising:
  at the connection circuit,
    establishing or releasing a connection between the first communications transceiver and the second communications transceiver;
    generating management information for managing the connection between the first communications transceiver and the second communications transceiver, the management information including authentication information transmitted from the terminal apparatus and also including identification information;
    storing the generated management information in a management information storage; and
    deleting at least the authentication information included in the management information relating to the connection when the connection is released;
  displaying, at the display, the authentication information transmitted from the terminal apparatus;
  receiving, at the user interface, an input from a user; and
  managing, by the connection manager circuit, a time that the user is permitted to connect to the network, in accordance with an instruction input by the user and whether or not the authentication information displayed by the display matches previously reported authentication information.

9. The communications method as claimed in claim 8, further comprising:
maintaining the connection until the time has elapsed; and
releasing the connection when the time has elapsed.

10. The communications method as claimed in claim 8, further comprising:
storing, at a connecting destination storage, connecting destination information indicating a connecting destination with which the terminal apparatus is capable of performing communications via the network; and
attaching, by an attaching circuit, the connecting destination information as a destination of information transmitted from the terminal apparatus to the network when starting the connection to allow the terminal apparatus to perform communications via the network.

11. The communications method as claimed in claim 10, wherein the connecting destination information indicates an Internet Protocol (IP) address of the connecting destination.

12. The communications method as claimed in claim 8, further comprising:
holding, at the management information storage, management information including identification information of the terminal apparatus to perform communications with the first communications transceiver; and
displaying, by the display, authentication information transmitted from the terminal apparatus and identification information included in the management information corresponding to the terminal apparatus.

13. The communications method as claimed in claim 8, wherein the first communications transceiver transmits and receives wireless communications, and the second communications transceiver transmits and receives wired communications.

14. The communications method as claimed in claim 8, wherein the connection destination is at least one of a multi-functional printer (MFP), a projector, and an interactive white board (IWB) located within the network.

15. A system, comprising:
a terminal apparatus;
a communications apparatus; and
a control apparatus configured to control communications between the terminal apparatus and the communications apparatus, wherein
the terminal apparatus includes:
a user interface configured to receive an input from a user; and
a transmitter configured to transmit authentication information input into the user interface,
the control apparatus includes:
a first communications transceiver configured to perform communications with the terminal apparatus;
a second communications transceiver configured to perform communications via a network; and
a connection circuit configured to:
establish or release a connection between the first communications transceiver and the second communications transceiver;
generate management information for managing the connection between the first communications transceiver and the second communications transceiver, the management information including the authentication information transmitted from the terminal apparatus and also including identification information;
store the generated management information in a management information storage; and
delete at least the authentication information included in the management information relating to the connection when the connection is released, and
the communications apparatus includes:
a display configured to display the authentication information transmitted from the terminal apparatus; and
a connection manager circuit configured to:
manage a time that the user is permitted to connect to the network, in accordance with an instruction input by the user and whether or not the authentication information displayed by the display matches previously reported authentication information.

16. The system as claimed in claim 15, wherein the connection manager circuit controls the connection circuit to maintain the connection until the time has elapsed, and to release the connection when the time has elapsed.

17. The system as claimed in claim 15, further comprising:
a connecting destination storage configured to store connecting destination information indicating a connecting destination with which the terminal apparatus is capable of performing communications via the network; and
an attaching circuit configured to attach the connecting destination information as a destination of information transmitted from the terminal apparatus to the network when the connection circuit starts the connection to allow the terminal apparatus to perform communications via the network.

18. The system as in claim 17, wherein the connecting destination storage is configured to store an Internet Protocol (IP) address of the connecting destination.

19. The system as in claim 15, wherein
the connection circuit controls the management information storage to hold management information including identification information of the terminal apparatus to perform communications with the first communications transceiver, and
the display displays the authentication information transmitted from the terminal apparatus and identification information included in the management information corresponding to the terminal apparatus.

20. The system as in claim 15, wherein the first communications transceiver transmits and receives wireless communications, and the second communications transceiver transmits and receives wired communications.

* * * * *